United States Patent
Nabeta

(10) Patent No.: US 8,027,236 B2
(45) Date of Patent: Sep. 27, 2011

(54) RECORDING AND REPRODUCING APPARATUS, METHOD OF CALCULATING TEMPERATURE CHARACTERISTIC COMPENSATION OPERATION COEFFICIENT, AND REPRODUCING APPARATUS

(75) Inventor: Masaomi Nabeta, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 12/802,313

(22) Filed: Jun. 3, 2010

(65) Prior Publication Data

US 2010/0322051 A1 Dec. 23, 2010

(30) Foreign Application Priority Data

Jun. 22, 2009 (JP) .............................. P2009-147405

(51) Int. Cl.
*G11B 7/00* (2006.01)
(52) U.S. Cl. ................. 369/53.37; 369/47.55; 369/44.32
(58) Field of Classification Search .......................... None
See application file for complete search history.

(56) References Cited

U.S. PATENT DOCUMENTS

| 6,097,688 | A | 8/2000 | Ichimura et al. |
| 6,172,957 | B1 | 1/2001 | Ogasawara |

FOREIGN PATENT DOCUMENTS

| JP | 09-251645 A | 9/1997 |
| JP | 10-269611 A | 10/1998 |
| JP | 2000-285484 A | 10/2000 |
| JP | 2002-352449 A | 12/2002 |

*Primary Examiner* — Jorge Ortiz Criado
(74) *Attorney, Agent, or Firm* — Lerner, David, Littenberg, Krumholz & Mentlik, LLP

(57) ABSTRACT

A recording and reproducing apparatus is provided, which includes a rotary drive unit, an optical pickup unit, an adjustment unit which compensates for changes in characteristics of the laser light caused by changes in temperature, a temperature detection unit which detects a temperature of the optical pickup unit, an evaluation value generation unit which generates an evaluation value based on reflected light information, and a control unit. The control unit performs a temperature acquisition process, an optimum point adjustment process, a temperature acquisition process for acquiring a detected temperature during spin down, an optimum point search process, and a temperature characteristic compensation operation coefficient calculation process for performing temperature compensation with respect to the adjustment values.

17 Claims, 20 Drawing Sheets

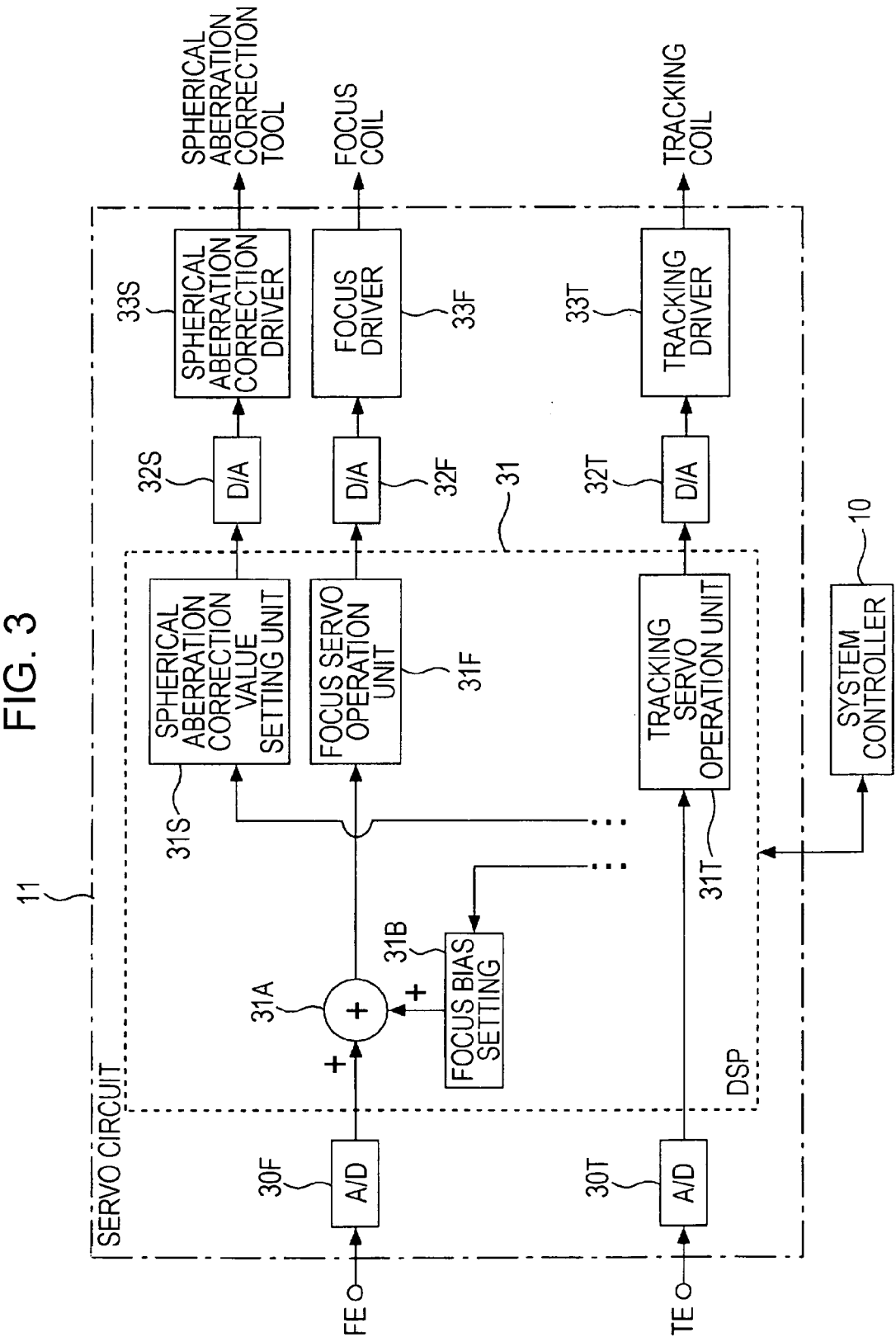

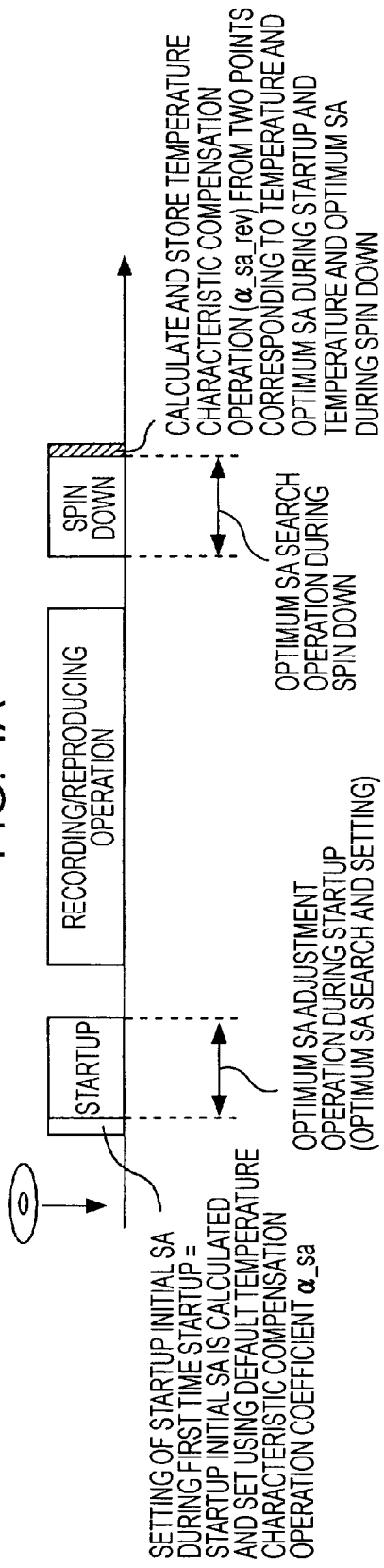
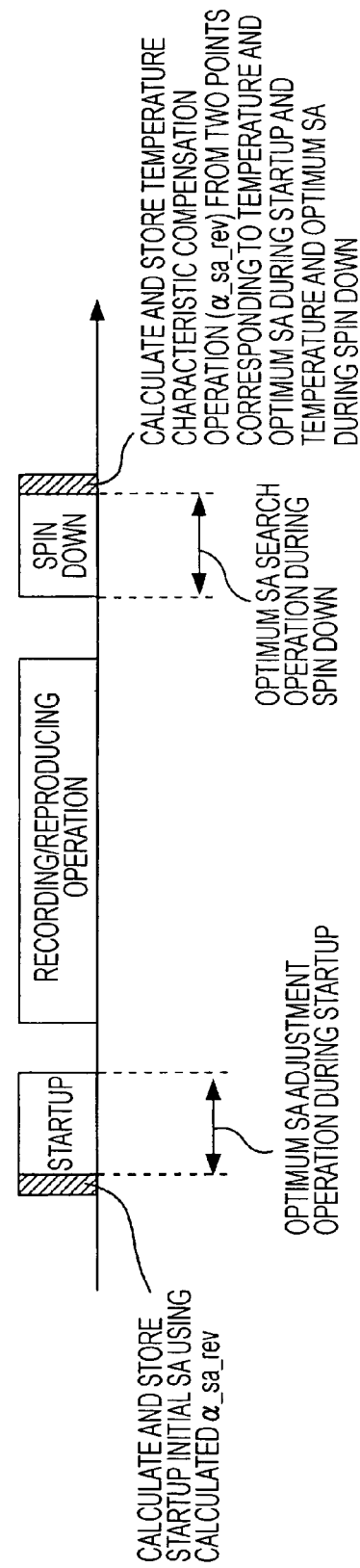
FIG. 4A
FIG. 4B

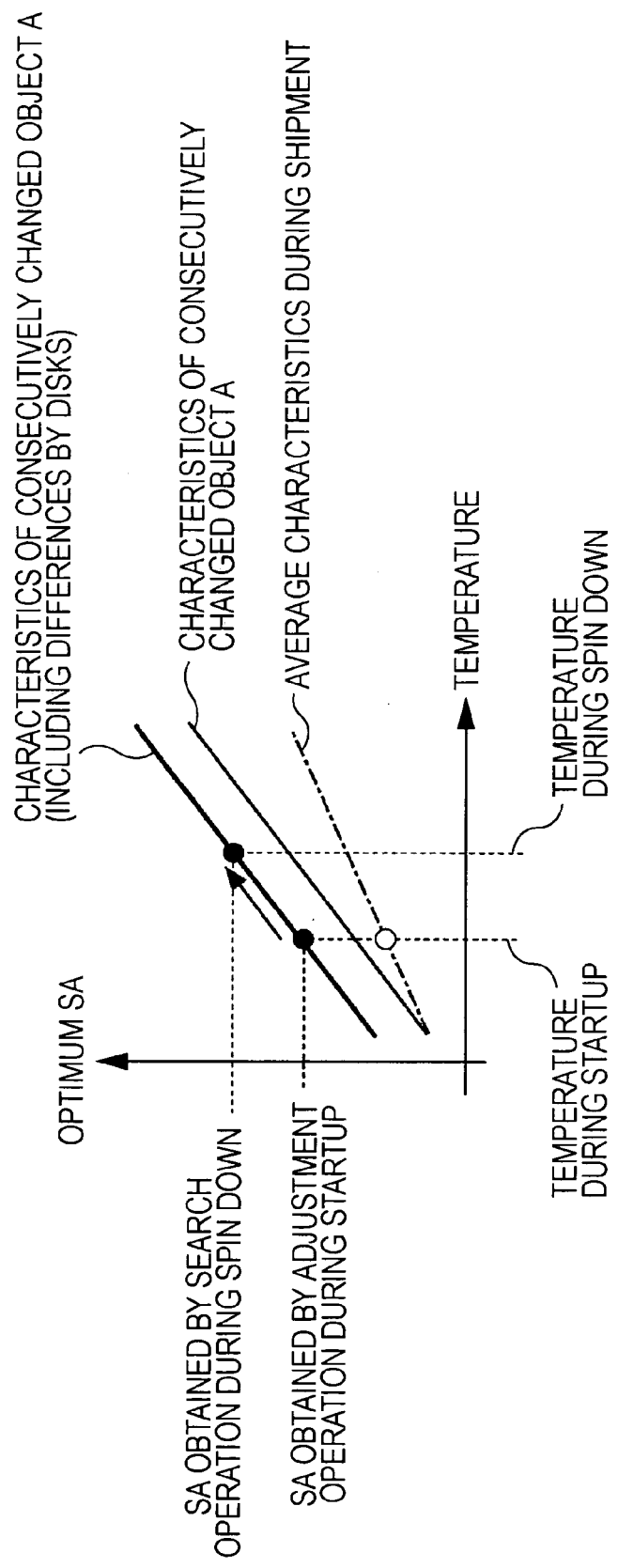

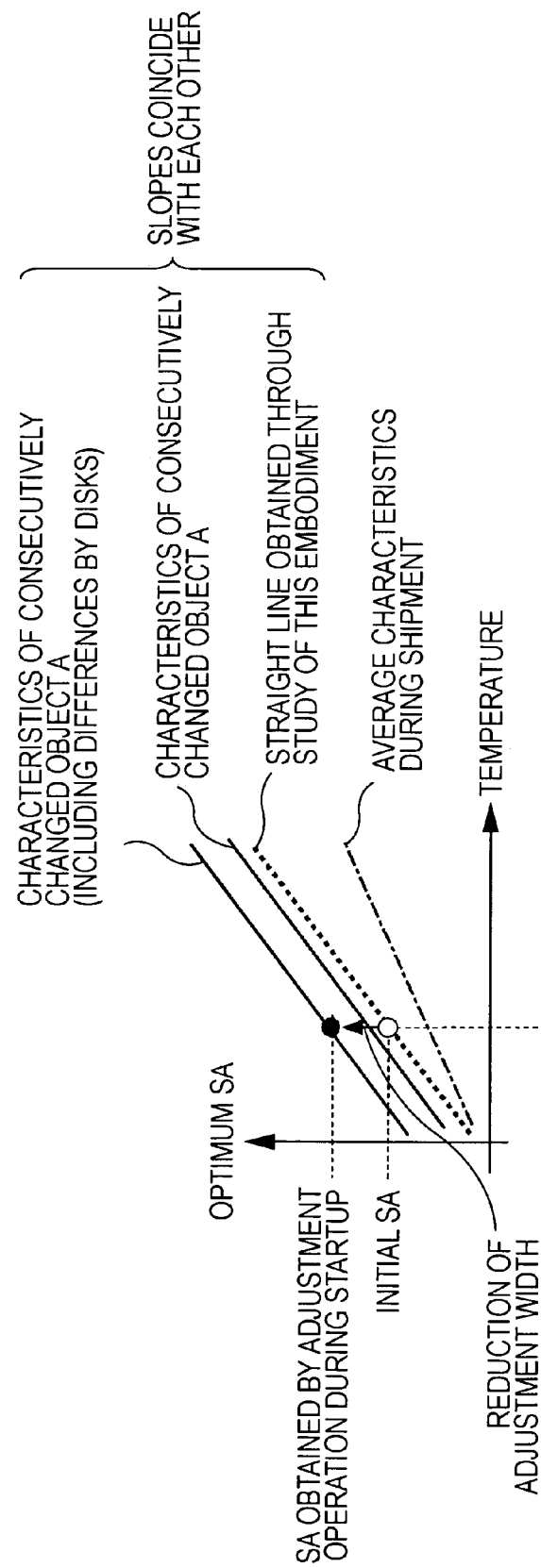

FIG. 16

| MEDIA TYPE AND RECORDING LAYER | COEFFICIENT |
|---|---|
| CD-R | $\alpha\_sa\_rev\_cr$ |
| DVD-ROM L0 | $\alpha\_sa\_rev\_drom0$ |
| ⋮ | ⋮ |
| BD-R L1 | $\alpha\_sa\_rev\_bdr1$ |

FIG. 17

| DISK IDENTIFICATION INFORMATION | COEFFICIENT |
|---|---|
| ID-1 | $\alpha\_sa\_rev1$ |
| ID-2 | $\alpha\_sa\_rev2$ |
| ⋮ | ⋮ |
| ID-n | $\alpha\_sa\_revn$ |

RECORDING AND REPRODUCING APPARATUS, METHOD OF CALCULATING TEMPERATURE CHARACTERISTIC COMPENSATION OPERATION COEFFICIENT, AND REPRODUCING APPARATUS

CROSS-REFERENCE TO RELATED APPLICATION

The present application claims priority from Japanese Patent Application No. JP 2009-147405 filed in the Japanese Patent Office on Jun. 22, 2009, the entire content of which is incorporated herein by reference.

BACKGROUND OF THE INVENTION

1. Field of the Invention

The present invention relates to a recording and reproducing apparatus which performs recording and reproducing with respect to an optical disc recording medium through laser light radiation, and more particularly to recording and reproducing apparatus having an adjustment unit which compensates for changes in characteristics of the laser light caused by changes in temperature, such as spherical aberration, focus bias, and tilt. Also, the present invention relates to a method of calculating a temperature characteristic compensation operation coefficient for an adjustment value of the adjustment unit. Further, the present invention relates to a reproducing apparatus having the adjustment unit as well as performing reproducing of the optical disc recording medium.

2. Description of the Related Art

As technology for recording and reproducing digital data, there is a data recording technology which uses an optical disc recording medium (hereinafter simply referred to as "optical disc"), such as a CD (Compact Disc), MD (Mini-Disc), and DVD (Digital Versatile Disc). An optical disc is a general name of a recording medium in which laser light is radiated on a disc composed of a metal thin film that is protected by plastic and a signal is read in accordance with a change in the reflected light from the disc.

Optical discs are divided into a reproducing dedicated-type, known as, for example, CD-ROM and DVD-ROM, and a user data recordable-type which is known as MD, CD-R, CD-RW, DVD-R, DVD-RW, DVD+RW, and DVD-RAM. On the recordable type optical disc, data can be recorded using a magneto-optical recording method, a phase-change recording method, or a pigment-film-change recording method. A pigment-film-change recording type optical disc is a so-called a write-once recording type optical disc. Since data can be recorded on the pigment-film-change recording type optical disc only once and no data rewriting is possible, the pigment-film-change recording type optical disc is appropriate to data preservation. On the other hand, according to a magneto-optical recording type optical disc or a phase-change recording-type optical disc, it is possible to rewrite data thereon, and thus they are used for various uses including recording of various kinds of content data such as music, videos, games, and application programs.

Further, a high-density optical disc, which is called a Blu-Ray disc (registered trademark, hereinafter also referred to as "BD") has recently been spread, and remarkably high capacity of an optical disc has been sought.

A high-density disc such as BD has a disc structure in which a cover layer of about 0.1 mm is provided in the disc thickness direction, and data is played from (or recorded on) the disc through a combination of a so-called blue-violet laser having a wavelength of about 405 nm and an object lens of which the NA (Numerical Aperture) is about 0.85.

However, as is known to all, in a recording and reproducing apparatus that performs recording and reproducing of an optical disc, a focus servo operation for controlling the focusing position of a laser light onto a recording surface of the disc and a tracking servo operation for controlling the laser light to trace a track (formed by a pit string or a groove) on the disc are performed.

Regarding the focus servo, it is known that applying an appropriate focus bias to a focus loop is necessary for an appropriate servo operation.

Particularly, in the case of a high-density disc, it is necessary to perform correction of spherical aberration to cope with thickness errors in the cover layer or a recording layer having a multilayer structure, and thus a recording and reproducing apparatus having a spherical aberration correction tool using an expander or a liquid crystal device, which is provided inside an optical pickup, has been developed (for example, see Japanese Unexamined Patent Application Publication Nos. 2002-352449 and 10-269611).

In a recording and reproducing apparatus provided with a lens having a high NA, such as BD, the margin of the focus bias or the spherical aberration are narrow, and thus their adjustment is necessary.

A focus bias adjustment method has been known, for example, as in Japanese Unexamined Patent Application Publication No. 2000-285484.

Also, a spherical aberration adjustment method has been known, for example, as in Japanese Unexamined Patent Application Publication No. 9-251645.

Also, an optical disc recording and reproducing apparatus that performs tilt correction to suppress a coma aberration has been known. As examples of tilt correction methods, a method of adjusting the slope of an optical disc, a method of performing an aberration correction though a liquid crystal device inserted onto an optical path have been known.

Here, according to a method to adjust the above-described optical values such as the values of focus bias, spherical aberration, and tile, evaluation values for the respective signals recorded under the condition that the respective adjustment values are set are obtained by reading the signals while changing the adjustment values within a specified range, and the optimum adjustment value is determined on the basis of the result of obtaining the evaluation values.

As described above, by obtaining the optimum adjustment value on the basis of the evaluation values actually measured, the differences by objects of the optical pickup or the optical disc, and further the consecutive changes of the characteristics can be absorbed.

The adjustment operation of the various kinds of adjustment values based on the above-described evaluation values actually measured is performed according to timing in which the optical disc is loaded, for example, as illustrated in FIG. 18.

The recording and reproducing operation is executed after the adjustment values such as the values of focus bias, spherical aberration, and tilt are adjusted to optimum values by the corresponding startup operation.

Also, before the start of the startup operation, the setting of the initial adjustment value (i.e. the setting of the startup initial adjustment value) for performing the corresponding startup operation is performed, which will be described later.

However, it is known that the optimum point of the adjustment values such as the values of focus bias, spherical aberration, and tilt changes depending upon the temperature change. That is, the occurrence of a temperature change causes a characteristic change in optical components such as an object lens, and the occurrence of the characteristic change causes the change of the optimum point. Also, a change in the optimum point also occurs due to a wavelength change in the laser light according to the temperature change.

The adjustment value of which the optimum point is changed depending upon the temperature is called "a characteristic change temperature-dependent adjustment value".

FIG. 19 is a diagram illustrating the change characteristic of the optimum point for the temperature change of the characteristic change temperature-dependent adjustment value.

In this case, in FIG. 19, as an example of the characteristic change temperature-dependent adjustment value, a spherical aberration correction value (hereinafter also referred to as "SA") is exemplified.

In FIG. 19, "characteristics of object A during shipment" that is indicated by a black solid line indicates the change characteristic of the optimum SA for the temperature change of the optical pickup as the object A during shipment, and "the characteristic of object B during shipment" that is indicated by a black dashed line indicates the temperature-optimum SA characteristic of the optical pickup as the object B during shipment.

Also, "average characteristic during shipment" that is indicated by a black dashed dot line indicates the average temperature-optimum SA characteristic of a plurality of optical pickups.

Also, "characteristics of the consecutively changed object A during shipment" that is indicated by a gray solid line indicates the temperature-optimum SA characteristic of object A after the lapse of a predetermined time from shipment, and "the characteristic of the consecutively changed object B" that is indicated by a gray dashed line indicates the temperature-optimum SA characteristic of object B after the lapse of a predetermined time from shipment in the same manner.

As illustrated in FIG. 19, the change characteristic of the optimum SA for the temperature change (i.e. the temperature-optimum SA characteristic) may approximate a straight line.

Also, as shown in the drawing, it is typical that the temperature-optimum SA characteristic differs for each object of the optical pickup, and even in the case of the same object, the consecutive change occurs.

Also, it is typical that during shipment, the characteristics of the respective objects (in the drawing, object A and object B) differ from the average characteristic (i.e. both the slope and offset of the straight line) after the consecutive changes. That is, the difference between the objects becomes relatively large.

Also, although not illustrated in FIG. 19, the temperature-optimum SA characteristic is changed by objects of the optical disc.

SUMMARY OF THE INVENTION

As described above, a change in the optimum point for the temperature can be compensated for by the adjustment operation during startup operation as shown in FIG. 18, but the problem is the setting of the initial adjustment value before the start of the startup operation.

According to the detailed setting method of the initial adjustment value before the start of the startup operation, for example, the measurement of the temperature-optimum value characteristic (straight line) for each object is pre-performed as shown in FIG. 19, and the initial adjustment value is set based on information of the corresponding straight line and information of the temperature actually measured at the start of the startup operation.

Specifically, in this case, for example, in a step before shipment of the product, the search for the optimum value is performed at temperatures of at least two points for each object, and information of the straight line of the temperature-optimum value characteristic for each object is obtained from a set of two temperature and optimum values (i.e. two points on the straight line in FIG. 19) obtained through the optimum value search. The information of their straight lines are stored in the recording and reproducing apparatus, and corresponding to this, the recording and reproducing apparatus performs calculation and setting of the optimum adjustment value based the information of the straight line and the temperature actually measured at the start of the startup operation.

By performing the above-described method, the optimum compensation state according to the object of the optical pickup can be obtained as the temperature compensation state at the start of the startup operation.

However, in the case of adopting this method, performing of the measurement as changing the temperature for each object in the step of product shipment, which is a greatly laborious task, is forced, and thus it is very difficult to actually perform this method. Also, even if it is possible to perform this method, a sharp increase in prices of the product due to the increase of personnel expenses is forced.

On the other hand, as a method that is opposite to the method of setting an initial adjustment value using the actually measured straight line information for each object, there is a method of setting the initial adjustment value at the start of the startup operation as a common fixed value for each object.

However, the method of setting the initial adjustment value as the fixed value is unable to perform temperature compensation.

Also, since the initial adjustment value is a fixed value, designing of a quite large margin is forced in order to enable the initial adjustment value to correspond to all combinations of temperatures, objects, and optical discs. That is, in order to derive the initial adjustment value in this case, it may be necessary to estimate various kinds of difference elements with very high accuracy.

Also, since it is necessary to take a quite large margin, a certain object may be in an overcompensation state, while another object may be in an insufficient compensation state, resulting in that the optimum compensation state is unable to be obtained from the viewpoint of the respective recording and reproducing apparatuses.

Also, as an intermediate method of the above-described two methods, a method of making a recording and reproducing apparatus have the straight line information as the average temperature-optimum value characteristic may be adopted.

Specifically, an average characteristic (straight line) of plural objects is calculated from, a data sheet or the like of the optical pickup, and the straight line information as the average characteristic is stored in the respective recording and reproducing apparatuses. In this case, the recording and reproducing apparatus performs temperature measurement at the start of the startup operation, and calculates and sets the startup initial adjustment value based on the straight line information and the temperature information measured at the start of the startup operation.

FIG. 20 is an image diagram of the method using the average characteristic. In the drawing, the adjustment value is SA.

In the drawing, "average characteristics during shipment" (indicated by black dashed dot line) corresponds to the average characteristic that is obtained in design on the basis of the data sheet or the like as described above. Also, in FIG. 20, "characteristics of the consecutively changed object A" (indicated by a gray solid line) as shown in FIG. 19 is also illustrated in comparison to the corresponding average characteristic.

In the drawing, a white ring-shaped stamp indicates the startup initial SA value that is calculated and set on the basis of the straight line information as the average characteristic and the measured temperature at the start of the startup operation.

Also, FIG. 21 is a diagram illustrating an image of the adjustment operation to the optimum adjustment value (SA also in this case) during startup operation.

In FIG. 21, in addition to the average characteristic (indicated by a black dashed dot line) as shown in FIG. 20, the initial SA (indicated by which ring-shaped stamp) at the start of the startup operation that is set based on the average characteristic, and characteristics of the consecutively changed object A (indicated by a gray solid line), characteristics of the consecutively changed object A including even the difference for each disc (indicated by a thick black solid line) and the optimum SA (indicated by a black ring-shaped stamp) provided by the optimum SA adjustment operation during startup operation are further illustrated.

According to the method using the "average characteristic" (the straight line information obtained in design) as described above, the measurement work for each object in the step of product shipment can be omitted.

Also, according to the method, since the setting of the initial adjustment value can be performed in consideration of the temperature, more appropriate initial adjustment value can be set in comparison to the method using the common fixed value.

However, in the same manner as the method using the fixed value, it is necessary for the method to take a margin that covers various kinds of differences for each object and each optical disc, and thus the optimum compensation state may not be obtained in the respective recording and reproducing apparatuses even by the method. Specifically, if it is assumed that the temperature characteristic deteriorates due to the consecutive change and the straight line information by a relatively large slope is set (e.g. the slope is set to coincide with the slope of the characteristic of the object A in FIG. 21), a certain object (e.g. the object B in FIG. 19) may be in an overcompensation state during shipment or may be in a state opposite thereto. Consequently, it is difficult to make an object in the optimum compensation state in the respective recording and reproducing apparatuses.

In view of the above situation, it is desirable to make it possible to provide a recording and reproducing apparatus having the following configuration.

According to an embodiment of the present invention, there is provided a recording and reproducing apparatus including a rotary drive unit which drives an optical disc recording medium to rotate; and an optical pickup unit which is configured to perform laser light radiation and reflected light detection with respect to the optical disc recording medium for data recording/reading.

Also, the recording and reproducing apparatus includes an adjustment unit which compensates for changes in characteristics of the laser light caused by changes in temperature.

Also, the recording and reproducing apparatus includes a temperature detection unit installed to perform temperature detection of the optical pickup unit.

Also, the recording and reproducing apparatus includes an evaluation value generation unit which generates an evaluation value that becomes an index of reproducing signal quality based on reflected light information obtained from the optical pickup unit.

Also, the recording and reproducing apparatus includes a control unit which performs the following processes.

That is, the control unit performs a temperature acquisition process during a startup operation for acquiring a detected temperature detected by the temperature detection unit as temperature information during a startup operation, corresponding to the startup operation that is performed as a preparation operation for enabling data reproducing after the optical disc recording medium is loaded.

Also, the control unit performs an optimum point adjustment process during a startup operation for sequentially changing adjustment values set by the adjustment unit to different values, searching for an optimum point of the adjustment values based on the result of acquiring an evaluation value that is generated by the evaluation value generation unit under the condition that the respective adjustment values are set, and controlling the adjustment unit to set the adjustment value as the optimum point.

Also, the control unit performs a temperature acquisition process during spin down for acquiring a detected temperature detected by the temperature detection unit as temperature information during spin down as a specified condition, which is predetermined so as to stop the rotation of the optical disc recording medium that is rotated by the rotary drive unit, which is satisfied after the startup operation is completed.

Also, the control unit performs an optimum point search process during spin down for sequentially changing the adjustment values to the different values as the specified condition is satisfied, and searching for the optimum point of the adjustment values based on the result of acquiring the evaluation value that is generated by the evaluation value generation unit under the condition that the respective adjustment values are set.

Also, the control unit performs a temperature characteristic compensation operation coefficient calculation process for calculating a temperature characteristic compensation operation coefficient for performing temperature compensation with respect to the adjustment values based on information on the optimum point during startup operation, which is obtained by the temperature information during startup operation and the optimum point adjustment process during startup operation, and information on the optimum point during spin down, which is obtained by the temperature information during spin down and the optimum point search process during spin down.

According to another embodiment of the present invention, there is provided a reproducing apparatus having the following configuration.

That is, a reproducing apparatus according to another embodiment of the present invention includes a rotary drive unit which drives an optical disc recording medium to rotate; and an optical pickup unit which is configured to perform laser light radiation and reflected light detection with respect to the optical disc recording medium for data reading.

Also, the reproducing apparatus includes an adjustment unit which compensates for changes in characteristics of the laser light caused by changes in temperature.

Also, the reproducing apparatus includes a temperature detection unit installed to perform temperature detection of the optical pickup unit.

Also, the reproducing apparatus includes an evaluation value generation unit which generates an evaluation value that becomes an index of reproducing signal quality based on reflected light information obtained from the optical pickup unit.

Also, the reproducing apparatus includes a control unit which performs the following processes.

That is, the control unit performs a temperature acquisition process during a startup operation for acquiring a detected temperature detected by the temperature detection unit as temperature information during a startup operation, corresponding to the startup operation that is performed as a preparation operation for enabling data reproducing after the optical disc recording medium is loaded.

Also, the control unit performs an optimum point adjustment process during a startup operation for sequentially changing adjustment values set by the adjustment unit to different values, searching for an optimum point of the adjustment values based on the result of acquiring an evaluation value that is generated by the evaluation value generation unit under the condition that the respective adjustment values are set, and controlling the adjustment unit to set the adjustment value as the optimum point.

Also, the control unit performs a temperature acquisition process during spin down for acquiring a detected temperature detected by the temperature detection unit as temperature information during spin down as a specified condition, which is predetermined so as to stop the rotation of the optical disc recording medium that is rotated by the rotary drive unit, which is satisfied after the startup operation is completed.

Also, the control unit performs an optimum point search process during spin down for sequentially changing the adjustment values to the different values as the specified condition is satisfied, and searching for the optimum point of the adjustment values based on the result of acquiring the evaluation value that is generated by the evaluation value generation unit under the condition that the respective adjustment values are set.

Also, the control unit performs a temperature characteristic compensation operation coefficient calculation process for calculating a temperature characteristic compensation operation coefficient for performing temperature compensation with respect to the adjustment values based on information on the optimum point during startup operation, which is obtained by the temperature information during startup operation and the optimum point adjustment process during startup operation, and information on the optimum point during spin down, which is obtained by the temperature information during spin down and the optimum point search process during spin down.

As described above, according to the embodiments of the present invention, with respect to characteristic change temperature-dependent adjustment values such as spherical aberration, focus bias, and tilt, an adjustment operation of an optimum point (i.e. search and setting of the optimum point) during a startup operation based on the evaluation value actually measured is performed, and search for the optimum point based on the evaluation value actually measured is performed even during spin down. In addition, during startup operation or during spin down, temperatures at that time are measured. Also, the temperature characteristic compensation operation coefficients are calculated based on information on the optimum point and temperature during startup operation and information on the optimum point and temperature during spin down. That is, two points on an approximation straight line of the temperature-optimum value characteristics are acquired, and the temperature characteristic compensation operation coefficient (i.e. slop of the straight line) is calculated from the two points.

As described above, according to the present invention, the temperature characteristic compensation operation coefficient that indicates the slope that reflects the actual temperature-optimum value characteristic (of the object and at that time) can be obtained with respect to the temperature-optimum value characteristic that is changed according to the object of the optical pickup and with the lapse of time. Accordingly, by using the temperature characteristic compensation operation coefficient as calculated above in calculating an initial adjustment value at the start of the startup, more accurate setting of the initial adjustment value corresponding to the characteristic differences or consecutive characteristic changes for the respective objects of the optical pickup can be performed.

As described above, according to the present invention, in the temperature compensation at the start of the startup with respect to the characteristic change temperature-dependent adjustment value, of which the optimum point is changed depending upon the temperature, the temperature characteristic compensation operation coefficient can be set as the coefficient that reflects the actual temperature-optimum value characteristic, and thus the optimum temperature compensation can be performed for each object of the optical pickup.

At the same time, the variation of the amount of compensation according to the consecutive changes or the like can be removed, and consequently, a typically stable record or reproducing performance can be maintained.

Also, according to the present invention, even an optical pickup which has a bad temperature-optimum value characteristic (i.e. which has a large change of the optimum value for the temperature change) or an optical pickup which has large consecutive changes of the temperature-optimum value characteristic can perform an optimum temperature compensation according to the object, and thus cost reductions of the product can be sought with the improvement in the yield.

BRIEF DESCRIPTION OF THE DRAWINGS

FIG. 3 is a block diagram illustrating an internal configuration of a servo circuit provided in a recording and reproducing apparatus according to an embodiment of the present invention;

FIGS. 4A and 4B are diagrams schematically illustrating a temperature compensation method according to a first embodiment of the present invention;

FIG. 5 is a diagram illustrating the relation between two points acquired during startup and during spin down and the actual temperature-optimum SA characteristic;

FIG. 6 is a diagram illustrating the situation during next time startup in the case in which the calculation and setting of a startup initial SA is performed by a method according to an embodiment of the present invention;

FIG. 16 is a diagram illustrating an example of information in which temperature characteristic compensation operation coefficients are stored for each media kind and recording layer;

FIG. 17 is a diagram illustrating an example of information in which temperature characteristic compensation operation coefficients are stored for each object of an optical disc;

DESCRIPTION OF THE PREFERRED EMBODIMENTS

Hereinafter, best modes (hereinafter referred to as embodiments) for carrying out the invention will be described. In addition, the explanation will be made in the following order.
1. First embodiment
   1-1. Configuration of a recording and reproducing apparatus
   1-2. Temperature compensation method according to a first embodiment
   1-3. Processing order
2. Second embodiment
   2-1. Temperature compensation method according to a second embodiment
   2-2. Processing order
3. Third embodiment
   3-1. Temperature compensation method according to a third embodiment
   3-2. Processing order
4. Fourth embodiment
   4-1. Temperature compensation method according to a fourth embodiment
   4-2. Processing order
5. Modified example

1. First Embodiment

[1-1. Configuration of a Recording and Reproducing Apparatus]

Whole Configuration of the Apparatus

Figure 1:
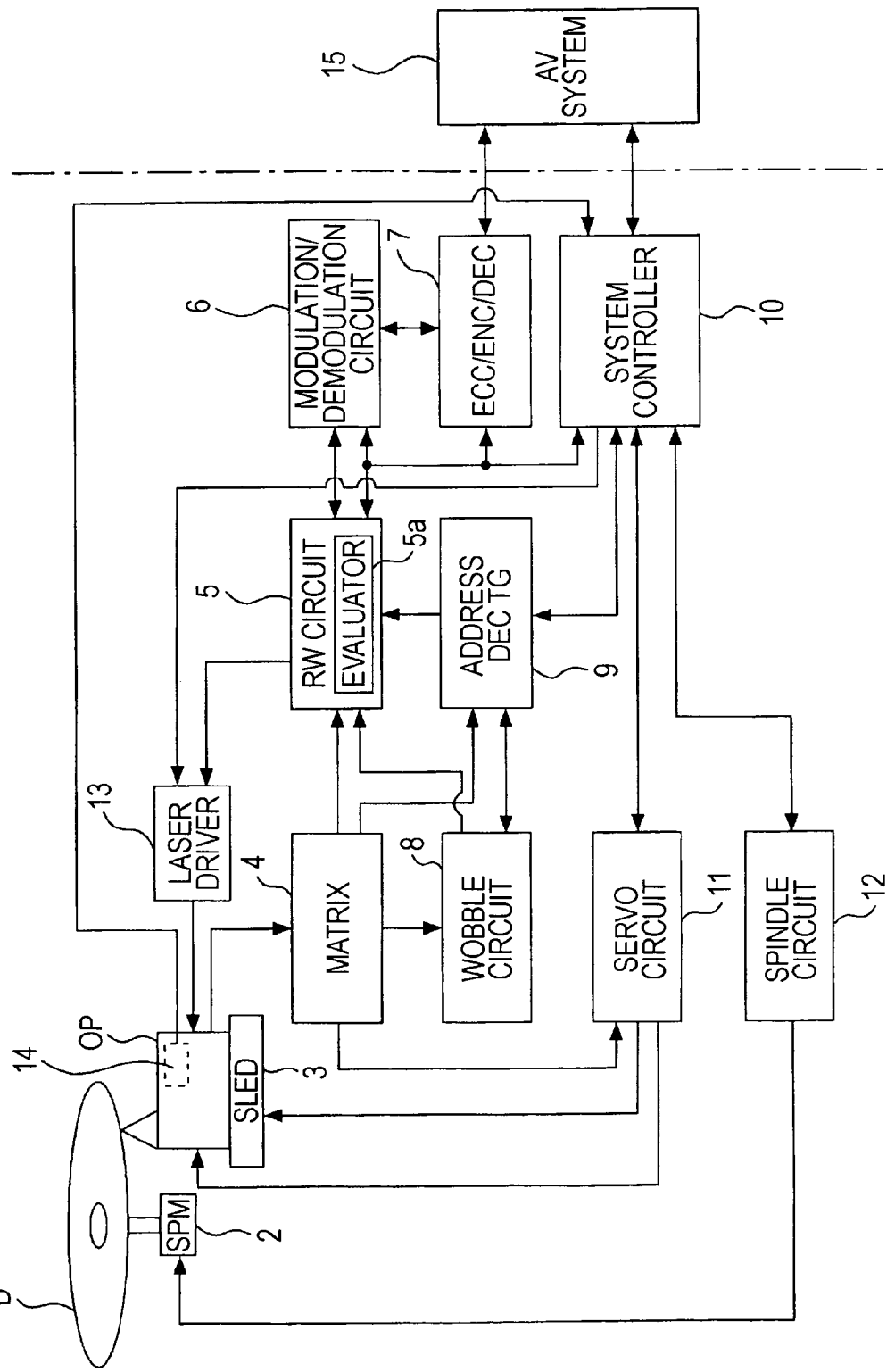
FIG. 1 is a block diagram illustrating an internal configuration of a recording and reproducing apparatus according to an embodiment of the present invention.

FIG. 1 is a block diagram illustrating an internal configuration of a recording and reproducing apparatus 1 according to an embodiment of the present invention.

Referring to FIG. 1, a disc D is so called an optical disc recording medium (hereinafter simply referred to as an "optical disc"). The optical disc is a general name of a recording medium in which laser light is irradiated on a disc composed of a metal thin film that is protected by plastic and a signal is read in accordance with a change in the reflected light from the disc.

A recording and reproducing apparatus 1 according to an embodiment of the present invention can correspond to an optical disc (i.e. writable disc) on which data is recorded in a phase method as the disc D. In this case, an oblique (or skewed) groove is formed on the disc D, and this groove becomes a recording track. In accordance with the oblique of the groove, address information or the like may be filled as so-called ADIP information.

The recording and reproducing apparatus 1 according to an embodiment of the present invention can also correspond to a so-called ROM type (reproducing dedicated type) disc D on which information recording has been performed by a pit/land combination in addition to the writable disc.

The disc D is loaded on a turntable (not illustrated), and is rotated, for example, at a constant linear velocity (CLV) by a spindle motor (SPM) 2 during recording and reproducing operation.

Also, reading of ADIP information that is filled as the oblique of the groove track on the disc D, reading of information recorded by a phase change mark, or reading of information recorded as a pit/land combination is performed by an optical pickup (optical head) OP.

Also, during recording, user data is recorded on the track as a phase change mark by the optical pickup OP.

In the optical pickup OP, a laser diode which is a laser light source, an optical detector for detecting a reflected light, an object lens which corresponds to an output of laser light, and an optical system (to be described later), which irradiates the laser light onto a recording surface of the disc through the object lens and leads the reflected light to the optical detector, are formed.

In the optical pickup OP, the object lens is kept to be movable in the tracking direction and in the focus direction by a two-axis tool.

Also, the whole pickup OP is movable in the disc radius direction by a sled tool 3.

Also, in the pickup OP, the laser diode is driven to emit laser light by a drive signal (i.e. drive current) from a laser driver 13.

In this case, to be described later, a tool for correcting a spherical aberration of the laser light is provided in the pickup OP, and the spherical aberration is corrected under the control of a system controller 10 and a servo circuit 11.

Also, in the embodiment of the present invention, a temperature sensor 14 for detecting the temperature of the corresponding pickup OP is installed in the pickup OP. Temperature information detected by the temperature sensor 14 is supplied to the system controller 10.

Reflected light information from the disc D that is obtained by the optical pickup OP is detected by the optical detector, and an electric signal according to the quantity of received light is supplied to a matrix circuit 4.

The matrix circuit 4 is provided with a current-voltage conversion circuit, and a matrix operation and amplification circuit, corresponding to output current from a plurality of light sensing elements which constitute the optical detector, and generates signals which are necessary for matrix operation processing.

For example, the matrix circuit generates a high frequency signal (which is ala so-called a reproducing data signal or an RF signal) that corresponds to reproducing data, a focus error signal for servo control, and a tracking error signal.

Further, the matrix circuit generates a signal regarding the oblique of the groove, i.e. a push-pull signal, as a signal for detecting the oblique (i.e. wobble amplitude).

The reproducing data signal output from the matrix circuit 4 is supplied to a reader/writer (RW) circuit 5, the focus error signal and the tracking error signal are supplied to the servo circuit 11, and the push-pull signal is supplied to a wobble circuit 8.

The reader/writer circuit 5 performs a binarization process and a PLL (Phase Locked Loop) process of the reproducing data signal (i.e. RF signal), and generates a reproducing clock. The binarization data from the reader/writer circuit 5 is supplied to a modulation/demodulation circuit 6.

In the embodiment of the present invention, the reader/writer circuit 5 is provided with an evaluator 5a for measuring a jitter value of the RF signal. The jitter value measured by the evaluator 5a is supplied to the system controller 10.

The modulation/demodulation circuit 6 is provided with a function portion that functions as a decoder during a reproducing operation, and a function portion that functions as an encoder during a recording operation.

During the reproducing operation, the modulation/demodulation circuit 6 performs demodulation of a runlength limited code based on a reproducing clock as a decoding process.

Also, an ECC encoder/decoder 7 performs an ECC encoding process for adding an error correction code during recording operation and an ECC decode process for performing error correction during reproducing operation.

During the reproducing operation, the ECC encoder/decoder inputs data demodulated by the modulation/demodulation circuit 6 to an internal memory, and performs an error detection/correction process, a deinterleaving process, and the like, to obtain reproducing data.

The data decoded to the reproducing data by the ECC encoder/decoder 7 is read on the basis of an instruction from the system controller 10, and then is transmitted to an AV (Audio-Visual) system 15.

A push-pull signal that is output from the matrix circuit 4 as a signal regarding the oblique of the groove is processed by a wobble circuit 8. The push-pull signal as ADIP information is demodulated to a data stream that is composed of an ADIP address by the wobble circuit 8, and then is supplied to an address decoder 9.

The address decoder 9 obtains an address value by performing decoding of the supplied data, and supplies the address value to the system controller 10.

Also, the address decoder 9 generates a clock through a PLL process using a wobble signal supplied from the wobble circuit 8, and supplies the clock to respective units as, for example, an encoding clock during recording.

During recording, the record data is transmitted from the AV system 15, and is sent to a memory (not illustrated) in the ECC encoder/decoder 7 to be buffered.

In this case, the ECC encoder/decoder 7 performs adding of an error correction code, interleave, or a sub code as a buffered record data encoding process.

Also, the modulation/demodulation circuit 6 performs a specified runlength encoding process (i.e. modulation process) of an RLL(1-7)PP method or the like, with respect to the ECC-encoded data, and supplies the processed data to the reader/writer circuit 5.

During recording, the clock generated from the wobble signal as described above is used as an encoding clock that is the reference clock for the encoding process.

The record data generated by the encoding process is sent to a laser driver 13 as a laser drive pulse after a fine adjustment of an optimum record power with respect to the characteristic of a recording layer, a spot shape of a laser light, recording linear velocity, and the like or an adjustment of a laser drive pulse wave is performed as a record compensation process in the reader/writer circuit 5.

The laser driver 13 provides the supplied laser drive pulse to a laser diode in the pickup OP to perform laser light emission. Accordingly, on the disc D, a mark (i.e. a phase change mark) according to the record data is formed.

The servo circuit 11 performs a servo operation by generating various kinds of servo drive signals for focus, tracking, and sled from the focus error signal and the tracking error signal which are provided from the matrix circuit 4.

That is, the servo circuit generates a focus drive signal and a tracking drive signal in accordance with the focus error signal and the tracking error signal, and drives a focus coil and a tracking coil of a two-axis tool in the pickup OP. Accordingly, a tracking servo loop and a focus servo loop are formed by the pickup (optical detector) OP, the matrix circuit 4, the servo circuit 11, and the two-axis tool.

Also, the servo circuit 11 turns off the tracking servo loop according to a track jump instruction from the system controller 10, and outputs a jump drive signal to perform a track jump operation.

Also, the servo circuit 11 generates a sled signal based on a sled error signal obtained as a low frequency component of the tracking error signal or an access execution control from the system controller 10, and drives the sled tool 3. Although not illustrated in the drawing, the sled tool 3 includes a main shaft that keeps the pickup OP, a sled motor, and a transfer gear, and the sled motor is driven according to the sled drive signal to perform slide movement of the pickup OP.

A spindle servo circuit 12 controls the CLV rotation of the spindle motor 2.

In the case where the disc D is a writable disc, the spindle servo circuit 12 obtains a clock that is generated in a PLL process of the wobble signal as the current rotating speed information of the spindle motor 2, and compares the current rotating speed information with specified CLV reference speed information to generate the spindle error signal.

Also, during data reproducing operation, a reproducing clock (i.e. a clock that is the basis of the decoding process) which is generated by the PLL process in the reader/writer circuit 5 becomes the current rotating speed information of the spindle motor 2, and the spindle error signal is generated by comparing the current rotating speed information with the specified CLV reference speed information.

The spindle servo circuit 12 performs the CLV rotation of the spindle motor 2 by outputting the spindle drive signal that is generated according to the spindle error signal.

Also, the spindle servo circuit 12 generates the spindle drive signal according to a spindle kick/brake control signal from the system controller 10 to perform a start, stop, acceleration, deceleration, or the like.

The various kinds of operations of the servo system and the recording and reproducing system as described above are controlled by the system controller 10 that is composed of a microcomputer.

The system controller 10 performs various kinds of processes according to a command from the AV system 15. For example, if a record command (i.e. write command) is given from the AV system 15, the system controller 10 moves the pickup OP onto an address where data is to be recorded. Then, the system controller 10 controls the ECC encoder/decoder 7 and the modulation/demodulation circuit 6 to perform the encoding process as described above with respect to the data (e.g. various types of video data such as MPEG2 or audio data) that is transmitted from the AV system 15. Accordingly, a laser drive pulse from the reader/writer circuit 5 is supplied to the laser driver 13, and the recording on the disc D is performed.

Also, for example, if a read command for demanding the transmission of certain data (e.g. MPEG2 video data) that is recorded on the disc D is supplied from the AV system 15, the system controller performs a seek operation control with respect to the instructed address. That is, the system controller sends an instruction to the servo circuit 11 to perform an access operation of the pickup OP to the target address designated by a seek command.

Then, the system controller performs necessary operation control for transmitting the data in the instructed data area to the AV system 15. That is, the system controller performs data reading from the disk D, and makes the reader/writer circuit 5, the modulation/demodulation circuit 6, and the ECC encoder/decoder 7 perform decoding, buffering, and the like to transmit the necessary data.

Here, in an example of FIG. 1, the recording and reproducing apparatus that is connected to the AV system 15 is exemplified. However, the recording and reproducing apparatus according to an embodiment of the present invention may be connected to a personal computer or the like.

Further, the recording and reproducing apparatus according to the present invention may not be connected to other devices. In this case, a manipulation unit or a display unit may be determined, or the configuration of the data input/output interface portion may differ from that as illustrated in FIG. 1. That is, the recording or reproducing is performed according to a user's manipulation, and a terminal unit for the input/output of various kinds of data may be formed.

Configuration in the Optical Pickup

Figure 2:
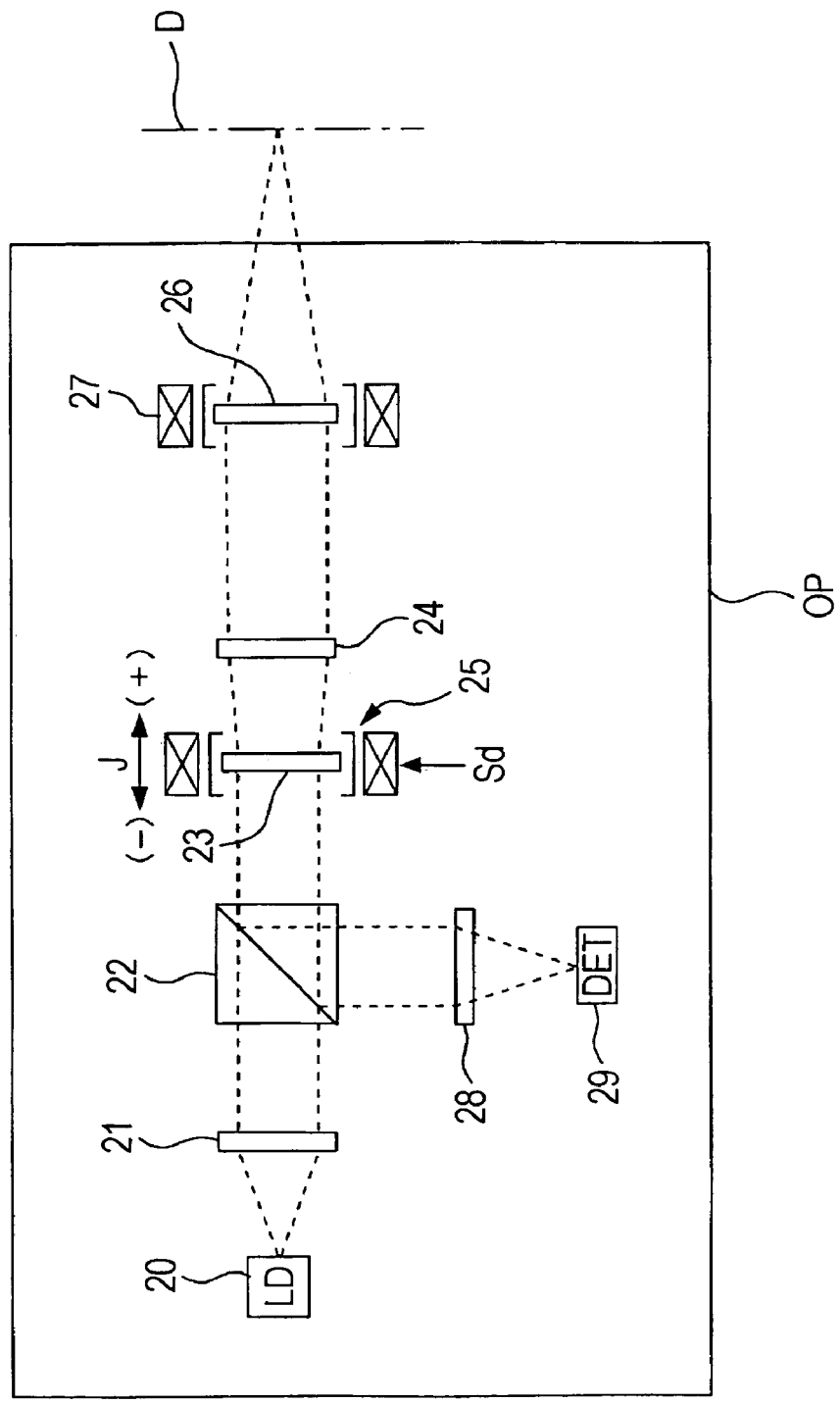
FIG. 2 is a diagram illustrating an internal configuration of an optical pickup (mainly, the configuration of an optical system) provided in a recording and reproducing apparatus according to an embodiment of the present invention.

FIG. 2 is a diagram illustrating an internal configuration of an optical pickup OP as illustrated in FIG. 1.

In FIG. 2, a recording surface of a disc (indicated by a dashed dot line) is also illustrated.

In FIG. 2, the laser light output from a semiconductor laser (i.e. laser diode) 20 becomes a parallel light through a collimator lens 21, is transmitted through a beam splitter 22, travels through a movable lens 23 and a fixed lens 24 as a spherical aberration correction lens group, and is irradiated onto the disc D through an object lens 26. In this case, the spherical aberration correction lenses 23 and 24 are called expanders. Since the spherical aberration correction is performed by driving the movable lens 23, the movable lens 23 will be particularly indicated as an expander 23 hereinafter.

The reflected light from the disc D is reflected from the beam splitter 22 through the object lens 26, the fixed lens 24, and the movable lens 23, and is irradiated to be condensed onto a light sensing surface of the optical detector 29 through the condenser lens 28.

In the optical system as described above, the object lens 26 is movably supported in focus and tracking directions by the two-axis tool 27, and thus the focus servo and the tracking servo are performed.

Also, the spherical aberration correction lenses 23 and 24 function to adjust the wave surface of the laser light. That is, the movable lens 23 is movable in a J direction that is a direction parallel to an optical axis by an actuator 25, and by this movement, the object point of the object lens 26 is adjusted.

That is, by controlling the actuator 25 to move forward and backward, the spherical aberration correction can be performed.

In FIG. 2, although a construction that performs the spherical aberration correction through the so-called expander is exemplified, a construction that performs the spherical aberration correction using a liquid crystal panel may also be adopted.

That is, a liquid crystal panel is inserted into the optical path from the semiconductor laser 20 to the object lens 26, and by variably adjusting the boundary between an area that transmits the laser light and an area that shades the laser light, the diameter of the laser light is varied to perform the spherical aberration correction.

In this case, the control is performed to vary the transmission area with respect to the liquid crystal driver that drives the liquid crystal panel.

Internal Configuration of a Servo Circuit

FIG. 3 shows an internal configuration of the servo circuit 11 as illustrated in FIG. 1.

In FIG. 3, the system controller 10 as illustrated in FIG. 1 is also illustrated.

As illustrated, the servo circuit 11 is provided with an A/D converter 30F, an A/D converter 30T, a DSP (Digital Signal Processor) 31, a D/A converter 32S, a D/A converter 32F, a D/A converter 32T, a spherical aberration correction driver 33S, a focus driver 33F, and a tracking driver 33T.

In FIG. 3, the focus error signal FE from the matrix circuit 4 as illustrated in FIG. 1 is input to the DSP 31 through the A/D converter 30F in the servo circuit 11. Also, in the same manner, the tracking error signal TE output from the matrix circuit 4 is input to the DSP 31 through the A/D converter 30T.

The focus error signal, which has been converted into a digital signal by the A/D converter 30F is input to the focus servo operation unit 31F through an adder 31A provided in the DSP 31.

A focus servo operation unit 31F generates and outputs a focus servo signal by performing a specified operation such as filtering for phase compensation or the like or loop gain processing with respect to the input focus error signal which has been converted into digital data. The focus servo signal is converted into an analog signal by the D/A converter 32F (which includes PWM, PDM), and is input to the focus driver 33F to drive a focus actuator. That is, a drive current is supplied to a focus coil of the two-axis tool 27 that maintains the object lens 26 in the pickup OP, and thus the focus servo operation is performed.

Also, the tracking servo operation unit 31T in the DSP 31 generates and outputs a tracking servo signal by performing a specified operation such as filtering for phase compensation or the like or loop gain processing with respect to the input tracking error signal which has been converted into digital data through the A/D converter 30T. The tracking servo signal is converted into an analog signal by the D/A converter 32T

(which includes PWM, PDM), and is input to the tracking driver 33T to drive a tracking actuator. That is, a drive current is supplied to a tracking coil of the two-axis tool 27, and thus the tracking servo operation is performed.

Also, the DSP 31 is provided with functions for focus bias addition, setting of a spherical aberration correction value, and adjustment of focus bias or spherical aberration correction value.

The adder 31A adds a focus bias to the focus error signal. The adding focus bias value is set in a focus bias setting unit 31B in the DSP 31. As the focus bias setting unit 31B outputs the focus bias value set by the system controller 10, an appropriate focus bias is added to the focus servo loop.

Also, in the spherical aberration correction value setting unit 31S of the DSP 31, the spherical aberration correction value is set by the system controller 10. The set spherical aberration correction value is input from the DSP 31 to the D/A converter 32S to be converted into an analog signal, and then is supplied to the spherical aberration correction driver 33S.

The spherical aberration correction driver 33S, for example, in the case of the spherical aberration correction tool as illustrated in FIG. 2, serves as a circuit which supplies a drive signal Sd to the actuator 25 that moves the expander 23. In the case of the spherical aberration correction tool using a liquid crystal panel, the spherical aberration correction driver serves as a circuit which supplies a signal Sd for instructing a voltage supply to necessary cells of the liquid crystal panel to the liquid crystal driver.

Accordingly, the spherical aberration correction driver 33S drives the spherical aberration correction tool in the pickup OP based on the spherical aberration correction value that is supplied from the spherical aberration correction value setting unit 31S.

[1-2. Temperature Compensation Method According to a First Embodiment]

Here, in the case of compensating for changes in characteristics of the laser light caused by changes in temperature, compensation of the spherical aberration, focus bias, and tilt of the light should be performed.

Hereinafter, with reference to FIGS. 4A to 6, a detailed temperature compensation method against the characteristic change temperature-dependent adjustment value, which is performed by the recording and reproducing apparatus 1 according to an embodiment of the present invention, will be described.

Hereinafter, to avoid the complexity in explanation, only the spherical aberration is exemplified as the characteristic that is changed by changes in temperature, and the temperature compensation with respect to the spherical aberration correction value is performed.

Also, hereinafter, the "spherical aberration correction value" is simply indicated as "SA".

FIGS. 4A and 4B are diagrams schematically illustrating a temperature compensation method according to a first embodiment of the present invention.

FIG. 4A shows the operation at the first time startup, and FIG. 4B shows the operation at the next time startup.

Here, the startup (i.e. startup operation) is a preparation operation for enabling data reproducing from the disc D, which starts, for example, depending upon the loading of the disc D.

Before explaining the detailed temperature compensation method according to the embodiment of the present invention, examples of a "temperature characteristic compensation operation coefficient" that is used for temperature compensation in the embodiment of the present invention and a method of calculating a "startup initial SA" at the start of the startup, which is performed using the temperature characteristic compensation operation coefficient will be described.

Figure 19:
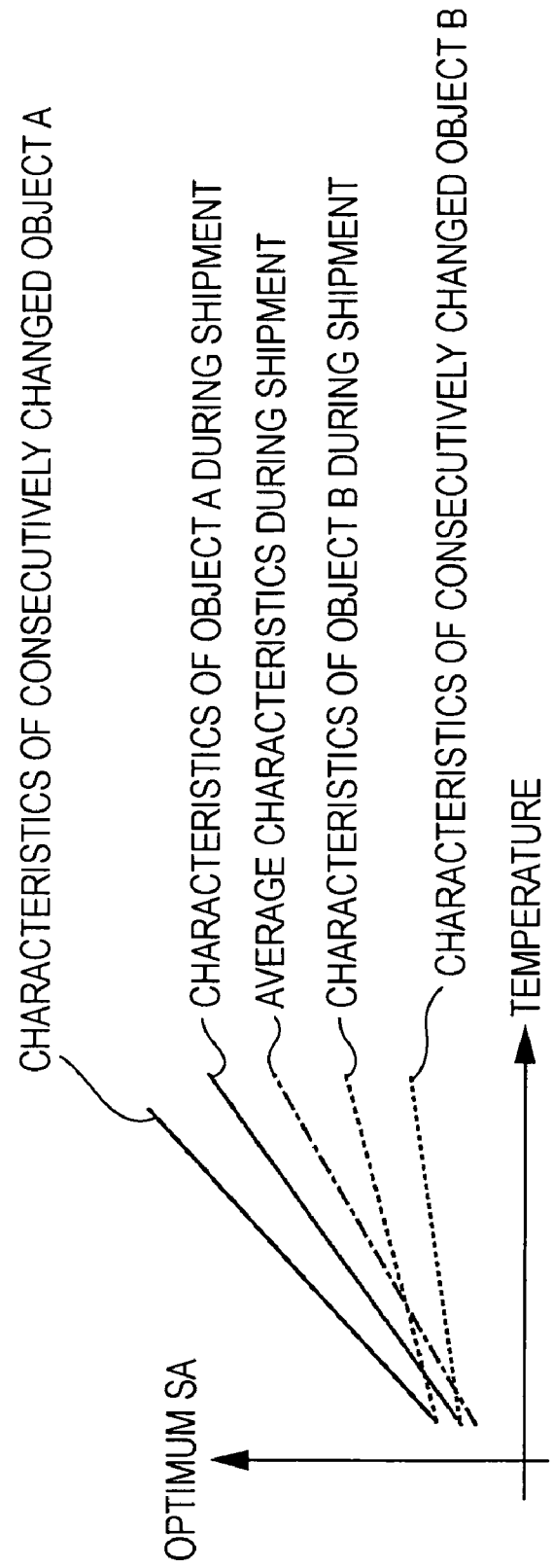
FIG. 19 is a diagram illustrating the change characteristic of an optimum point for the temperature change of the characteristic change temperature-dependent adjustment values.
Figure 20:
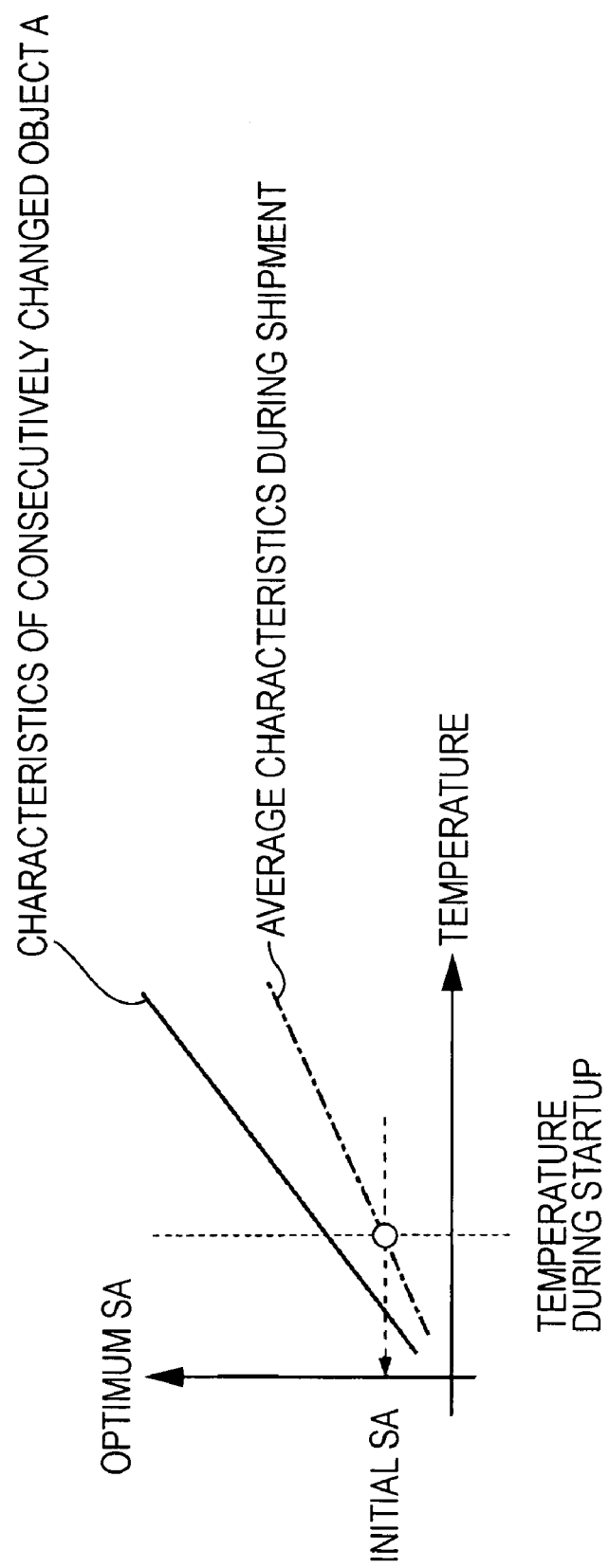
FIG. 20 is a diagram illustrating an image according to a method in the related art that uses an average characteristic determined in design in calculating the startup initial adjustment value.

First, as previously described with reference to FIG. 19, the temperature-optimum value characteristic for the characteristic change temperature-dependent adjustment value such as a spherical aberration correction value may approximate a straight line. In an example based on this, the startup initial SA SA_start that is set at the start of the startup operation is calculated by the following Equation (1).

$$SA\_start = \alpha\_sa \times (T\_start - T\_default) + SA\_default \quad (1)$$

where, in Equation (1),

T_start: temperature at the start of the startup,

SA_default: designed value of the optimum SA at a temperature T_default,

T_default: temperature at which SA-default is calculated, and

α_sa: temperature characteristic compensation operation coefficient (slope of a straight line) that is determined in design.

In this case, the temperature characteristic compensation operation coefficient α_sa is determined in consideration of, for example, an average slope of a plurality of optical pickups OP, which is derived from a data sheet of the optical pickup OP or the like, or the consecutive change of the temperature-optimum SA characteristic. That is, it may be considered that Equation (1) corresponds to an equation for calculating the startup initial SA value based on the straight line information (optimum SA=α_sa×temperature+offset) as the "average characteristic during shipment" shown in FIG. 19.

In order to make it possible to calculate the startup initial SA by Equation (1), information of "α_sa", "SA_default", and "T_default" has already been stored in, for example, a memory provided in the system controller 10 in the recording and reproducing apparatus 1 according to the embodiment of the present invention.

Based on the above-described premise, the temperature compensation at the first time startup of FIG. 4A will be described.

At the first time startup, as illustrated in FIG. 4A, the startup initial SA is calculated and set using the default temperature characteristic compensation operation coefficient α_sa. That is, according to Equation (1), the startup initial SA SA_start is calculated and set.

Specifically, at the start of the first time startup, the system controller 10 acquires temperature information detected by a temperature sensor 14, and maintains the acquired temperature information as the temperature at the start of the startup T_start. Thereafter, based on the information on the temperature at the start of the startup T_start and Equation (1), the system controller calculates the startup initial SA SA_start, and sets the calculated startup initial SA value with respect to the servo circuit 11 (the spherical aberration correction value setting unit 31S). Accordingly, the expander 23 as illustrated in FIG. 2 is driven to a position according to the startup initial SA value, and as a result, the spherical aberration correction value is adjusted for the startup initial SA. In other words, the setting of the startup initial SA is performed.

During startup operation, after the setting of the startup initial SA, an adjustment operation to the optimum SA is performed. That is, the optimum SA search operation based on the evaluation value actually measured and the optimum SA setting operation, which is obtained thereby, are performed.

In order to realize the optimum SA adjustment operation, the system controller 10 sequentially sets different SAs with respect to the servo circuit 11, and acquires evaluation values (in this case, jitter values) calculated by respective evaluators 5a under the setting of their different SAs. Also, the system controller determines the optimum SA (e.g. SA of which the jitter value become at minimum) from the evaluation values, and sets the optimum SA with respect to the servo circuit 11.

Here, the optimum SA that is obtained by the optimum SA adjustment operation (i.e. search operation) during corresponding startup operation is indicated as "SA_st_opt".

Here, for confirmation, in the case of the apparatus which can perform recording on the disc D as in the embodiment of the present invention, test record data can be spontaneously recorded on the disc D during above-described optimum SA adjustment operation. Accordingly, if data for performing the optimum SA search operation with respect to the loaded disc D is in an unrecorded state, the test record data is spontaneously recorded before the search operation is performed.

Also, in order to correspond to the startup operation, temperature measurement is performed during startup, together with the optimum SA adjustment operation. That is, in order to correspond to the startup operation, the system controller 10 acquires the detected temperature information by the temperature sensor 14, and maintains the acquired temperature information as the temperature during startup.

It is assumed that the temperature during startup is "T_st_opt".

After the startup operation as describe above is completed, the recording and reproducing operation on the disc D is performed.

After the completion of the recording and reproducing operation, as the predetermined spin down condition is satisfied, a spin down process for stopping the rotation of the spindle motor 2 is performed.

Here, in the embodiment of the present invention, the "optimum SA search operation during spin down" as indicated in the drawing is performed even during spin down.

That is, as the spin down condition (a predetermined condition on which the rotation of the disc D by the spindle motor 2 should be stopped) is satisfied, the spin down process is not immediately performed, but the optimum SA search operation which is the same as that during startup operation is performed.

In this case, the spin down condition may be satisfied when a spin down command is supplied from the AV system (on the host side) 15, or when a predetermined time elapses after the completion of the recording and reproducing operation (which is a so-called a spin down by a standby timer).

The optimum SA search operation during spin down is performed based on the evaluation value actually measured.

Specifically, even in this case, the system controller 10 sequentially sets different SAs with respect to the servo circuit 11, and acquires the evaluation values calculated by the respective evaluators 5a under the setting of their different SAs. Then, the system controller determines the optimum SA from their evaluation values.

It is assumed that the optimum SA that is obtained through the optimum SA search operation during spin down is "SAs_d_opt".

Also, during spin down, the measurement of the temperature during spin down is also performed. Specifically, the system controller 10 acquires the temperature information detected by the temperature sensor 14 during spin down, and maintains the temperature information as the temperature during spin down.

It is assumed that the temperature during spin down is "T_sd_opt".

After the optimum SA search operation and the temperature measurement during spin down are performed as described above, a new temperature characteristic compensation operation coefficient is calculated from a set of the optimum SA SA_st_opt during startup that is maintained during startup and the temperature T_st_opt during startup and a set of the optimum SA SA_sd_opt during spin down and the temperature T_sd_opt during spin down.

Here, it is typical that the temperature in the optical pickup OP is gradually increased with the lapse of time after the startup (i.e. the startup operation) of the recording and reproducing apparatus 1. Based on this, the acquisition of the set of the temperature T_st_opt during startup and the optimum SA SA_st_opt and the set of the temperature T_sd_opt during spin down and the optimum SA SA_sd_opt corresponds to the sampling of two points on a straight line as the temperature-optimum SA characteristic.

FIG. 5 is a diagram illustrating the relation between two points acquired during startup and during spin down and the actual temperature-optimum SA characteristic.

Figure 21:
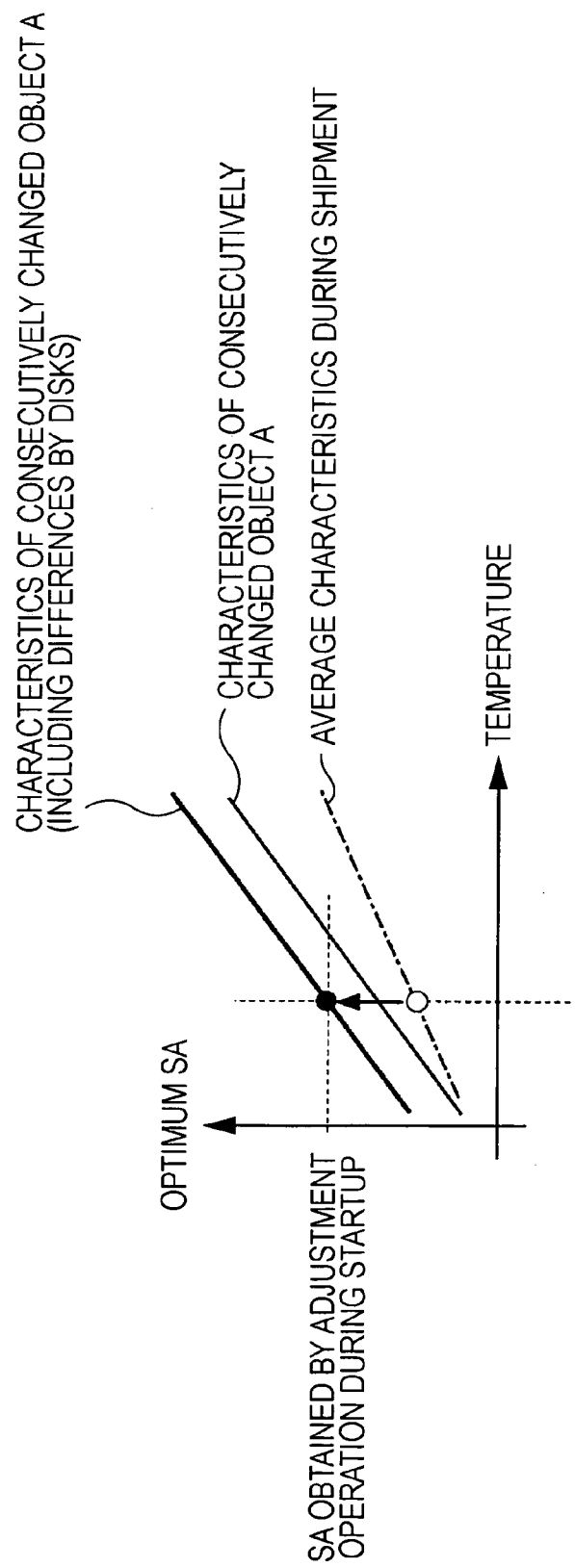
FIG. 21 is a diagram illustrating an image of an adjustment operation to the optimum adjustment value during a startup operation.

In FIG. 5 illustrating the temperature-optimum SA characteristic, the horizontal axis represents temperature, and the vertical axis represents the optimum SA. As the temperature-optimum SA characteristics, "average characteristics during shipment" (indicated by a black dashed dot line), "characteristics of the consecutively changed object A" (indicated by a gray solid line), and "characteristics of the consecutively changed object A" (indicated by a black thick solid line), which includes differences for respective discs, are illustrated as shown in FIG. 21 as described above.

In the drawing, "the characteristic of the consecutively changed object A" (indicated by a black thick solid line), which includes differences for respective discs, corresponds to the actual temperature-optimum SA characteristic.

As clearly illustrated with reference to FIG. 5, it can be understood that the relation equation of the actual temperature-optimum SA is obtained by acquiring two points during startup and during spin down and solving simultaneous equations using the two points.

Specifically, the relation equation of the temperature-optimum SA at this time is expressed by the following Equation (2).

$$SA = (SA\_sd\_opt - SA\_st\_opt)/(T\_sd\_opt - T\_st\_opt) \times T + (SA\_st\_opt \times T\_sd\_opt - SA\_sd\_opt \times T\_st\_opt)/(T\_sd\_opt - T\_st\_opt) \quad (2)$$

Here, the second term "(SA_st_opt×T_sd_opt−SA_sd_opt×T_st_opt)/(T_sd_opt−T_st_opt)" which corresponds to the offset of Equation (2) that is a straight line includes an inherent aberration of the loaded disc D, and thus it is difficult to apply this term to another disc D.

By contrast, the coefficient of the first term "(SA_sd_opt−SA_st_opt)/(T_sd_opt−T_st_opt)" which corresponds to the slope of the straight line of Equation (2) expresses the temperature dependence of the optimum SA at the time point of the optical pickup OP.

Accordingly, in the embodiment of the present invention, it is assumed that the coefficient of the first term of Equation (2) is used as a new temperature characteristic compensation operation coefficient α_sa_rev in calculating the next time startup initial SA. That is, $$\alpha\_sa\_rev = (SA\_sd\_opt - SA\_st\_opt)/(T\_sd\_opt - T\_st\_opt) \quad (3)$$

The system controller 10 stores the temperature characteristic compensation operation coefficient α_sa_rev calculated by Equation (3) in, for example, the above-described memory in order to use it in calculating the next time startup initial SA.

At the start of the next time startup operation as illustrated in FIG. 4B, the system controller calculates and sets the startup initial SA using the temperature characteristic compensation operation coefficient α_sa_rev calculated by Equation (3).

Specifically, the system controller calculates the startup initial SA using the following Equation (4) that is obtained by updating the temperature characteristic compensation operation coefficient α_sa in Equation (1) as described above to the temperature characteristic compensation operation coefficient α_sa_rev.

$$SA\_start = \alpha\_sa\_rev \times (T\_start - T\_default) + SA\_default \quad (4)$$

Due to this, the system controller 10, at the start of the next time startup operation (i.e. the startup operation after the spin down), measures (or acquires) the temperature T_start at the start of the startup, calculates the startup initial SA based on the temperature T_start at the start of the startup and the Equation (4), and sets the calculated startup initial SA in the servo circuit 11.

At the next time startup operation, in the same manner as the first time startup operation as described above, the system controller acquires the temperature during optimum SA adjustment operation or during startup. Also, during spin down, the system controller acquires the temperature during optimum SA search operation during spin down or during spin down, and calculates and stores a new temperature characteristic compensation operation coefficient α_sa_rev.

In the first embodiment, the system controller repeats operations of calculating and storing the new temperature characteristic compensation coefficient α_sa_rev for each spin down and operations of calculating and setting the startup initial SA that uses the stored temperature characteristic compensation operation coefficient α_sa_rev.

FIG. 6 is a diagram illustrating the situation during next time startup in the case in which the calculation and setting of the startup initial SA is performed by the method according to an embodiment of the present invention as described above.

In the same manner as FIG. 5, the horizontal axis represents temperature, and the vertical axis represents the optimum SA. Also, "average characteristics during shipment" (indicated by a black dashed dot line), "characteristics of the consecutively changed object A" (indicated by a gray solid line), and "characteristics of the consecutively changed object A" (indicated by a black solid line), which includes differences for respective discs, are illustrated in FIG. 6. Also, a "straight line obtained by the method according to the embodiment of the present invention" (indicated by a black thick dashed line) in the drawing indicates the straight line that is obtained from Equation (4) as described above.

As can be known with reference to Equation (4), the offset of the "straight line obtained by the method according to the embodiment of the present invention" is set to the same value as the offset of "average characteristics during shipment" that is obtained in design. However, the slope can be set to coincide with the actual temperature-optimum SA characteristic (in the drawing, "characteristics of the consecutively changed object A" that includes the differences for respective discs). Due to this, in comparison to a case where the compensation using the "average characteristic during shipment" is performed, the SA at the start of the startup can be set to a value that is closer to the actual optimum value. That is, the compensation state at the start of the startup can be more preferable.

Also, as can be seen clearly in the drawing, the adjustment width to the optimum SA during startup operation can be smaller than that in the case of using the "average characteristics during shipment". As a result, the optimum SA adjustment operation during startup operation can be performed more easily (i.e. can be performed stably), and the time that is necessary for the adjustment can be shortened.

As described above, according to the temperature compensation method according to the embodiment of the present invention, with respect to the temperature-optimum SA characteristic, which includes differences for respective objects of the optical pickup OP and in which the consecutive change occurs, two points on the straight line are actually acquired during startup and during spin down, and the temperature characteristic compensation operation coefficient which corresponds to the slope of the straight line is calculated from the two points. Further, the corresponding temperature characteristic compensation operation coefficient is used in setting the initial SA at the start of the startup.

As described above, the slope of the straight line as the temperature-optimum SA characteristic expresses the temperature dependence of the optimum SA (which includes the consecutively changed amount) that is inherent to the optical pickup OP, and by performing the temperature compensation based on the temperature characteristic compensation operation coefficient that is obtained as described above, the compensation states at the start of the startup square with each other for the respective objects of the optical pickup OP (i.e. for the respectively apparatuses). That is, in the case of using the "average characteristic during shipment" in the related art, it may not be possible that all the respective objects of the optical pickup OP are in the optimum compensation state, whereas according to the embodiment of the present invention, the occurrence of such situation can be effectively prevented.

Also, according to the embodiment of the present invention, since the optimum compensation state can be presented for the respective objects of the optical pickup OP, even the optical pickup OP having a bad temperature-optimum SA characteristic (i.e. having a large change of the optimum SA against the temperature change) or the optical pickup OP having a large consecutive change of the temperature-optimum SA characteristic can perform the optimum temperature compensation according to its objects. As a result, the cost reductions of the product can be sought by the improvement in the yield.

Here, the temperature-optimum value characteristic against the characteristic change temperature-dependent adjustment value including the temperature-optimum SA characteristic may be changed according to the position on the disc D. For example, in consideration of the spherical aberration, due to the differences in optimum SA value on the surface of the disc D, which is caused by non-uniformity in the thickness of the cover layer of the disc D, the temperature-optimum SA characteristic is also changed depending upon the position on the disc D.

As described above, in the embodiment of the present invention, the temperature characteristic compensation operation coefficient is calculated based on the result of acquisition of the respective points (i.e. a set of a temperature and the optimum SA) on the straight line during startup and during spin down. As can be understood from the foregoing description, it is preferable that the temperature characteristic compensation operation coefficient indicates the temperature dependence of the optimum SA purely for each optical pickup OP. Accordingly, it is ideal that the temperature characteristic compensation operation coefficient does not include the change amount that depends upon the position of the disc D as described above.

In consideration of this point, in the embodiment of the present invention, the optimum SA search operation during startup operation and the optimum SA search operation during spin down for obtaining the two points on the straight line are performed using the same area on the disc D. That is, in the optimum SA search operation during startup operation and the optimum SA search operation during spin down, the evaluation values are generated using the read data from the same area on the disc D.

More specifically, although the optimum SA search operation determines the optimum SA using the evaluation values calculated under the setting of the respective SAs by sequentially changing the SA, the data (address) read under the setting of the respective SAs are made to coincide with each other in the search operation during startup and the search operation during spin down.

As described above, by performing the optimum SA search operation during startup operation and the optimum SA search operation during spin down using the same area on the disc D, the change amount that depends upon the position of the disc D is not included in the searched optimum SA, and thus the coefficient that indicates the temperature dependence of the optimum SA purely for each optical pickup OP can be obtained as the temperature characteristic compensation operation coefficient α_sa_rev that is calculated on the basis of the searched optimum SA.

Accordingly, the temperature compensation at the start of the startup using the temperature characteristic compensation operation coefficient α_sa_rev can be performed more accurately.

[1-3. Processing Order]

Figure 7:
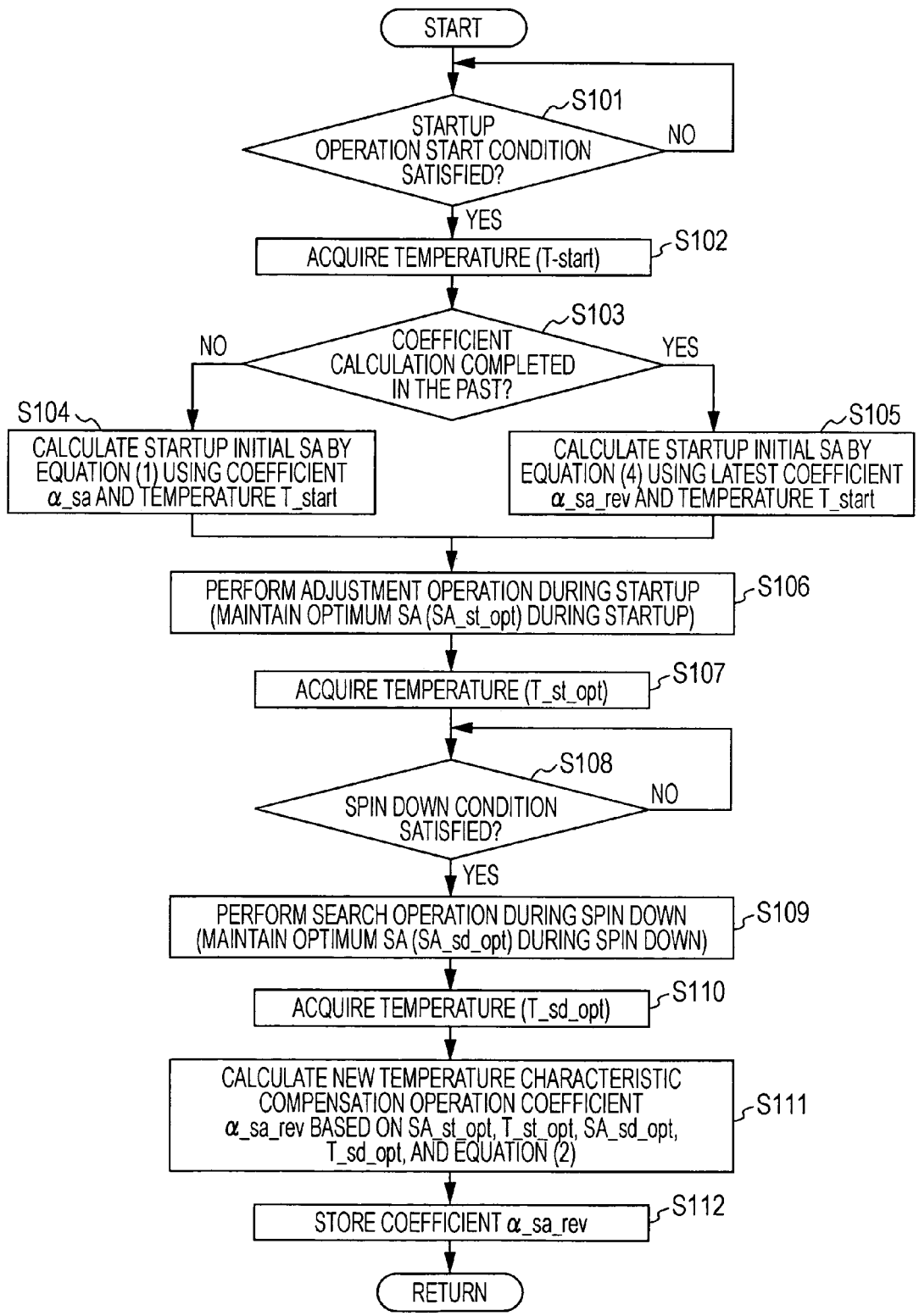
FIG. 7 is a flowchart illustrating an order of processes for realizing a temperature compensation method according to a first embodiment of the present invention.

FIG. 7 is a flowchart illustrating an order of processes for realizing a temperature compensation method according to a first embodiment of the present invention.

In FIG. 7, the order of detailed processes for realizing the temperature compensation method according to the first embodiment of the present invention is illustrated as the order of processes which the system controller 10 as illustrated in FIG. 1 performs based on a program stored in, for example, an internal memory.

Referring to FIG. 7, first, in step S101, the processing is in a standby state until the start condition of the startup operation is satisfied.

The start condition of the startup operation may be, for example, loading of a new disc D, supply of write command/read command from the AV system 15 after the spin down.

The processing in step S101 is, for example, as the start condition, to start the startup operation in advance, and the processing is in a standby state until the predetermined condition is satisfied.

In the case where the startup operation start condition is satisfied, in step S102, the processing for acquiring the temperature is performed. That is, the detected temperature information by the temperature sensor 14 is acquired, and the acquired temperature information is maintained as a temperature T_start at the start of the startup.

In the following step S103, it is determined whether the calculation of the coefficient has been completed. That is, it is determined whether the temperature characteristic compensation operation coefficient α_sa_rev is in a calculated state.

If it is determined in step S103 that the temperature characteristic compensation operation coefficient α_sa_rev has not been calculated and thus the calculation of the coefficient has not been completed (if a negative result is obtained), the processing proceeds to step S104, and the startup initial SA is calculated and set by Equation (1) using the coefficient α_sa and the temperature T_start. That is, if the calculation of the coefficient α_sa_rev is not completed and the first time startup operation starts, a startup initial SA based on a predetermined default temperature characteristic compensation operation coefficient α_sa is set.

As illustrated, after the processing in the corresponding step S104 is performed, the processing proceeds to step S106.

On the other hand, if it is determined in step S103 that the temperature characteristic compensation operation coefficient α_sa_rev has been calculated and thus the calculation of the coefficient has been completed (if a positive result is obtained), the processing proceeds to step S105, and the startup initial SA is calculated and set by Equation (4) using the latest coefficient α_sa_rev and the temperature T_start.

After the processing in the corresponding step S105 is performed, the processing proceeds to step S106.

In step S106, the processing for performing the adjustment operation during startup is performed. That is, the control of the servo circuit 11 and a necessary operation are performed so that the optimum SA adjustment operation (the optimum SA search and setting operation) during startup operation as described above is performed.

In accordance with the adjustment operation during startup operation, the optimum SA SA_st_opt during startup is obtained by the optimum SA search operation. In step S106, the optimum SA SA_st_opt during startup that is obtained as described above is maintained.

Here, in the embodiment of the present invention as describe above, the optimum SA search operation during startup operation and the optimum SA search operation during spin down are performed using the same area on the disc D. Accordingly, in step S106, the control of the servo circuit 11 is performed so that the data reading for generating evaluation values during optimum SA search operation is performed with respect to a specified area on a predetermined disc D.

In the following step S107, temperature acquisition is performed. That is, the detected temperature information by the temperature sensor 14 is acquired, and the acquired temperature information is maintained as the temperature T_st_opt during startup.

In the following step S108, the processing is in a standby state until the spin down condition is satisfied.

That is, for example, the processing is in a standby state until the predetermined condition is satisfied, such as the supply of a spin down command from the AV system 15 (on the host side) as described above, the lapse of a predetermined time from the end of recording and reproducing operation, and stopping of the rotation of the disc D by the spindle motor 2.

If the spin down condition is satisfied, in step S109, the processing for executing the search operation during spin down is performed. That is, the control of the servo circuit 11 and necessary operation are performed so that the optimum SA search operation during spin down as described above is performed.

Since the optimum SA SA_sd_opt during spin down is obtained by the optimum SA search operation during spin down, in step S109, the corresponding optimum SA SA_sd_opt during spin down is maintained.

Also, in the embodiment of the present invention, since the optimum SA search operation during spin down is performed using the same area as that for the search operation during startup, in step S109, the control of the servo circuit 11 is performed so that the data reading for generating evaluation values during optimum SA search operation is performed with respect to the above-described specified area.

In the following step S110, the temperature acquisition is performed. That is, the detected temperature information by the temperature sensor 14 is acquired, and the acquired temperature information is maintained as the temperature T_sd_opt during spin down.

In the following step S111, a new temperature characteristic compensation operation coefficient α_sa_rev is calculated on the basis of SA_st_opt, T_sd_opt, SA_sd_opt, and T_sd_opt and Equation (2).

Then, in the following step S112, the coefficient α_sa_rev is stored in, for example, an internal memory of the system controller 10.

After the corresponding step S112 is performed, the processing returns to the above-described step S101 ("RETURN" in the drawing).

Here, in the foregoing description, it is exemplified that the temperature acquisition process during startup and the temperature acquisition process during spin down are preformed after the optimum SA search operation. However, the temperature acquisition process may be performed in parallel during performing of the search operation, or may be performed just before the search operation is performed.

That is, the temperature acquisition process may be performed in timing that corresponds to the startup operation and the spin down operation (in a range including their neighborhood).

2. Second Embodiment

[2-1. Temperature Compensation Method According to a Second Embodiment]

Next, a second embodiment of the present invention will be described.

In the second embodiment, the optimum SA search operation during spin down and the calculation of a new temperature characteristic compensation operation coefficient α_sa_rev are performed only in the case where a temperature difference between the startup operation and the spin down is equal to or larger than a predetermined value (which is denoted as T_th).

That is, if the temperature difference between the startup operation and the spin down is smaller than T_th, the optimum SA search operation during spin down is omitted, and thus the reduction of the processing load can be sought.

The configuration of a recording and reproducing apparatus according to the second embodiment of the present invention is the same as that according to the first embodiment of the present invention, and thus the duplicate explanation thereof will be omitted.

[2-2. Processing Order]

Figure 8:
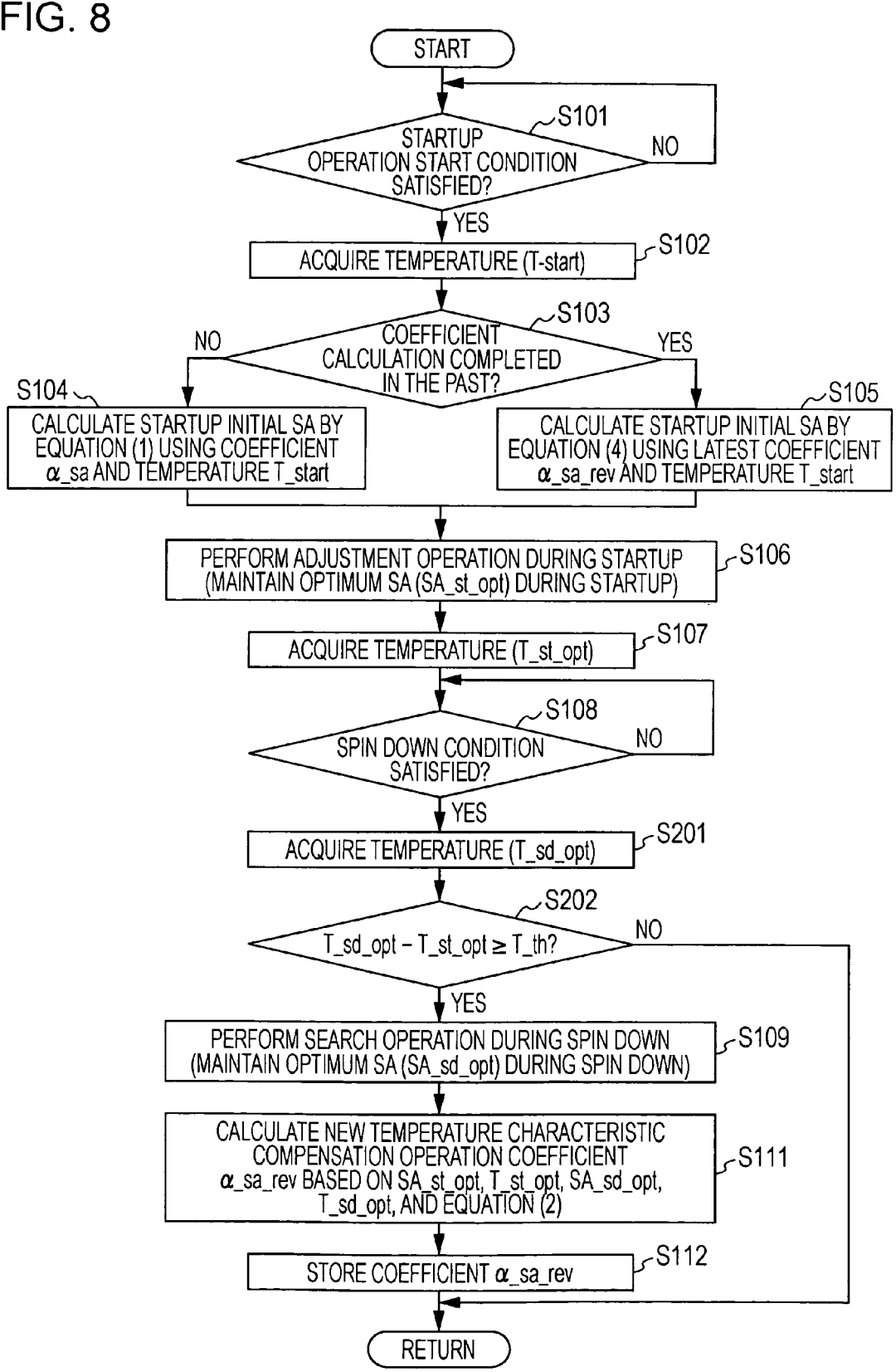
FIG. 8 is a flowchart illustrating an order of processes for realizing a method according to a second embodiment of the present invention.

FIG. 8 is a flowchart illustrating the order of processes for realizing a temperature compensation method according to the second embodiment of the present invention.

In the drawing, the order of processes that the system controller 10 as illustrated in FIG. 1 performs based on a program stored in, for example, an internal memory is illustrated.

Also, in the drawing, with respect to the same processes as those as described above according to the first embodiment, the same step numbers are given, and the explanation thereof will be omitted.

In FIG. 8, the processing in steps S101 to S108 is the same as that according to the first embodiment.

In the second embodiment, as the spin down condition is satisfied in step S108, the temperature acquisition is first performed in step S201. That is, the temperature T_sd_opt during spin down is acquired (and maintained).

Then, in the following step S202, it is determined whether the condition "T_sd_opt−T_st_opt≧T_th" is satisfied. That is, based on the temperature T_st_opt during startup which is obtained through the optimum SA adjustment operation during startup operation in step S106, the temperature T_sd_opt during spin down that is acquired in step S201, and the predetermined value T_th stored in advance in, for example, an internal memory, it is determined whether the condition "T_sd_opt−T_st_opt≧T_th" is satisfied.

In step S202, if it is determined that the condition T_sd_opt−T_st_opt≧T_th" is not satisfied and a negative result is obtained, the processing returns to step S101.

On the other hand, in step S202, if it is determined that the condition T_sd_opt−T_st_opt≧T_th" is satisfied and a positive result is obtained, the processing proceeds to step S109. Accordingly, the optimum SA search operation during spin down is performed.

After the processing in step S109 is performed, the calculation of a new temperature characteristic compensation operation coefficient α_sa_rev is performed in step S111, and the coefficient α_sa_rev is stored in step S112.

3. Third Embodiment

[3-1. Temperature Compensation Method According to a Third Embodiment]

In the third embodiment, an average value of temperature characteristic compensation operation coefficients calculated in the past is used to set the initial adjustment value at the start of a startup operation.

The configuration of a recording and reproducing apparatus according to the third embodiment of the present invention is the same as that according to the first embodiment of the present invention, and thus the duplicate explanation thereof will be omitted.

Here, in the recording and reproducing apparatus according to the third embodiment, a value (which is considered as m) for determining the number of calculated values of temperature characteristic compensation operation coefficients in the past, of which an average value is to be calculated, is set in advance.

In this case, the system controller 10 calculates a "temperature-optimum SA" set and an average value of the latest m temperature characteristic compensation operation coefficients α_sa_hist, which are maintained as their history when the calculation of the temperature characteristic compensation operation coefficients based on the "temperature-optimum SA" acquired during spin down is performed m times, i.e. when an effective history number of the temperature characteristic compensation operation coefficients becomes equal to or larger than m. Then, the system controller uses the average value as the temperature characteristic compensation operation coefficient α_sa_rev for calculating the startup initial SA at the start of the startup.

As described above, by calculating the average value of m temperature characteristic compensation operation coefficients α_sa_hist calculated in the past as the temperature characteristic compensation operation coefficient α_sa_rev for calculating the startup initial SA, more accurate temperature characteristic compensation operation coefficient α_sa_rev can be obtained, and as a result, the temperature compensation at the start of the startup becomes more appropriate.

[3-2. Processing Order]

Figure 9:
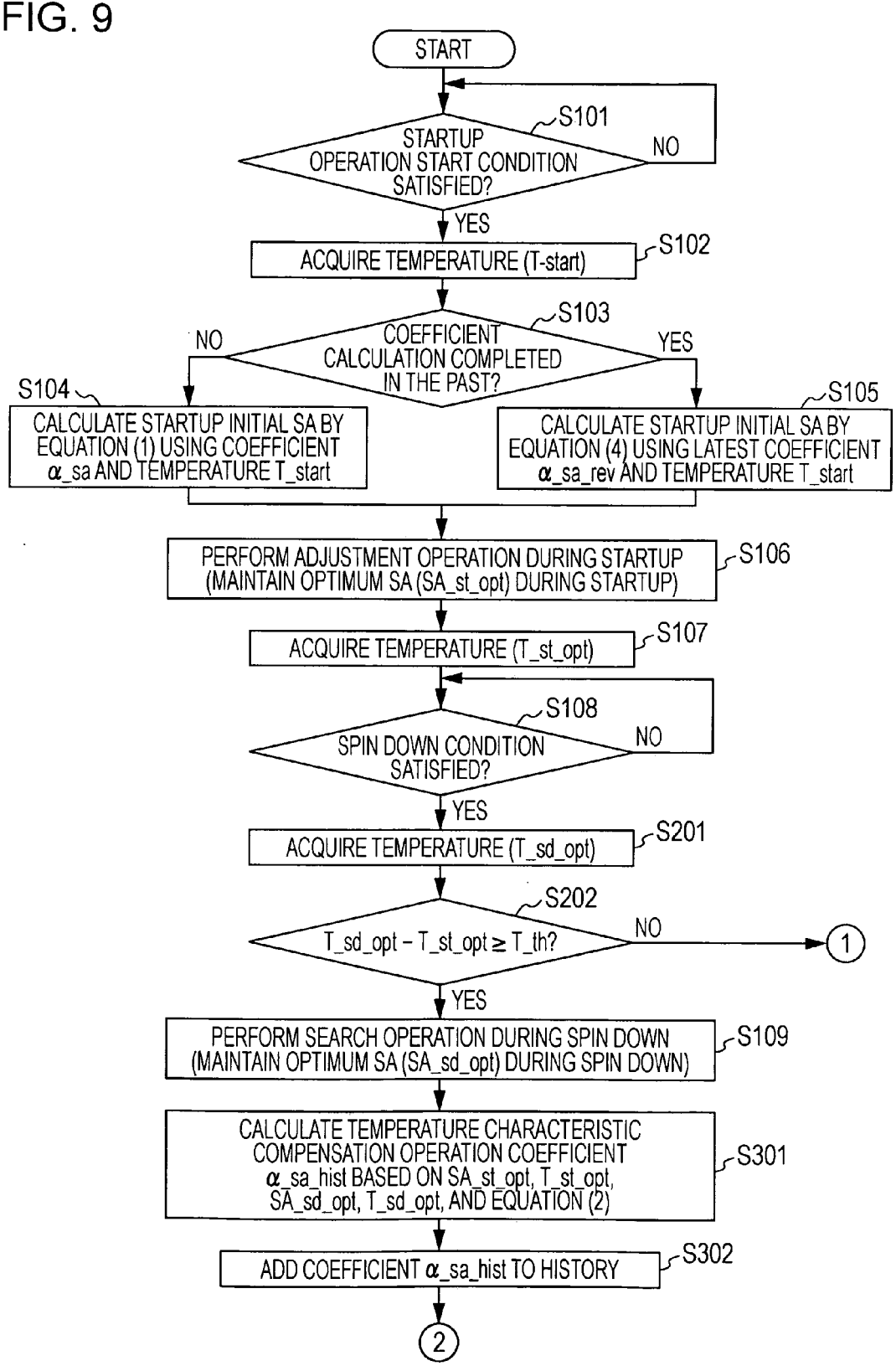
FIG. 9 is a flowchart illustrating an order of processes for realizing a method according to a third embodiment of the present invention.
Figure 10:
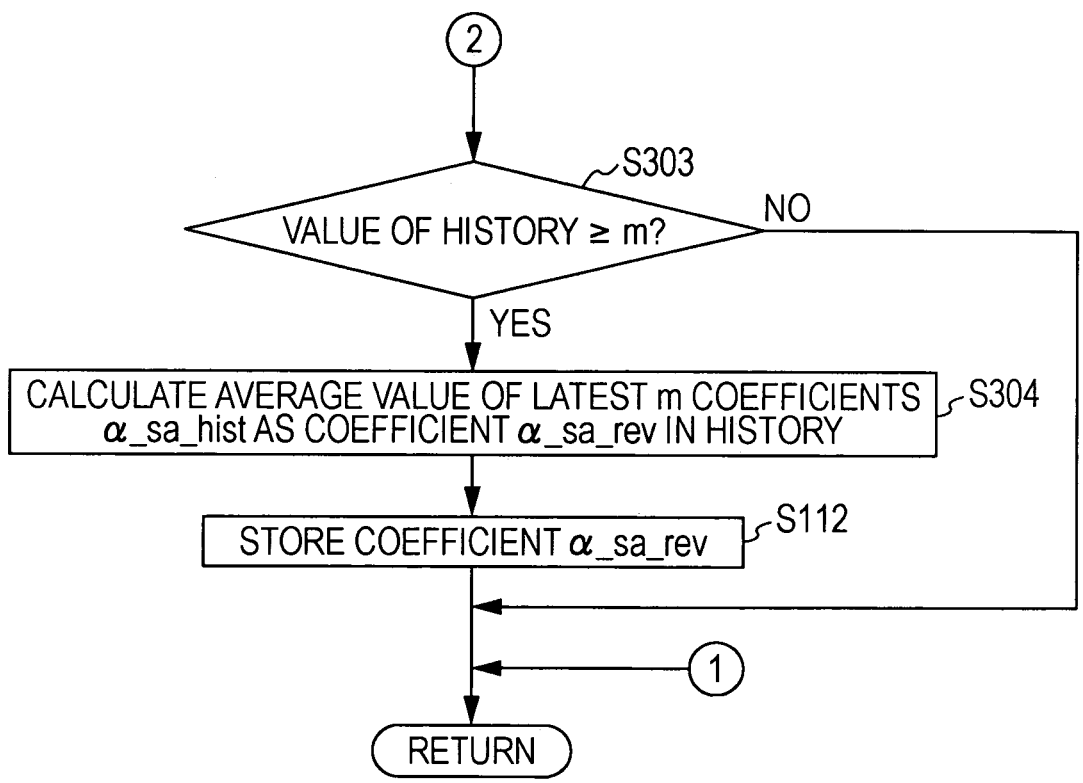
FIG. 10 is a flowchart illustrating an order of processes for realizing a method according to a third embodiment of the present invention in the same manner.

A flowchart of FIGS. 9 and 10 illustrates an order of processes for realizing the method according to the third embodiment.

In the drawing, the order of processes that the system controller 10 as illustrated in FIG. 1 performs based on a program stored in, for example, an internal memory is illustrated.

Also, in the drawing, with respect to the same processes as those as described above according to the first embodiment, the same step numbers are given, and the explanation thereof will be omitted.

As can be known by comparing FIGS. 9 and 10 with FIG. 8, the processing order in the third embodiment is determined in a manner that steps S301 to 5304 are inserted between the steps S109 and 5112 in the processing order according to the second embodiment of the present invention.

Specifically, in this case, after the search operation during spin down is performed in step S109 as illustrated in FIG. 9, the temperature characteristic compensation operation coefficient α_sa_hist is calculated on the basis of SA_st_opt, T_st_opt, SA_sd_opt, T_sd_opt, and Equation (2) in step S301.

Then, in the following step S302, the calculated temperature characteristic compensation operation coefficient α_sa_hist is added to the history.

Here, in the third embodiment, as described above, the temperature characteristic compensation operation coefficient α_sa_rev is calculated using the latest m temperature characteristic compensation operation coefficients α_sa_hist. Due to this, it is necessary that history information of the temperature characteristic compensation operation coefficient α_sa_hist is information whereby it can be grasp at least which temperature characteristic compensation operation coefficient α_sa_hist corresponds to the latest m temperature characteristic compensation operation coefficients α_sa_hist.

Accordingly, the processing in step S302 is performed so as to grasp which temperature characteristic compensation operation coefficient α_sa_hist corresponds to the latest m temperature characteristic compensation operation coefficients α_sa_hist and to add the calculated temperature characteristic compensation operation coefficient α_sa_hist to the history.

Specifically, if the history number becomes m+1 as a newly calculated temperature characteristic compensation operation coefficient α_sa_hist is added to the history, the oldest temperature characteristic compensation operation coefficient α_sa_hist is excluded from the history, and the newly calculated temperature characteristic compensation operation coefficient α_sa_hist is added to the history. Accordingly, after the history number becomes m, only the latest m temperature characteristic compensation operation coefficients α_sa_hist exist in the history (i.e. only coefficients necessary for the calculation of the average value exist), and thus the memory can be used efficiently.

On the other hand, history information in which the temperature characteristic compensation operation coefficients α_sa_hist simply correspond to time information for the calculation of the coefficients may be generated. In this case, in calculating the coefficients α_sa_hist as the average value, the latest m coefficients α_sa_hist can be identified based on the time information.

After the processing in the step S302 is performed, the processing proceeds to step S303 as illustrated in FIG. 10, and it is determined whether the history number is equal to or larger than m.

In step S303, if it is determined that the history is not equal to or larger than m and a negative result is obtained, the processing returns to step S101 as illustrated in FIG. 9.

On the other hand, if it is determined that the history is equal to or larger than m and a positive result is obtained in step S303, the processing proceeds to step S304, and the average value of the latest m coefficients α_sa_hist is calculated as the coefficient α_sa_rev.

After the coefficient α_sa_hist is calculated in step S304, the coefficient α_sa_rev is stored in step S112, and the processing returns to step S101.

Here, in the processing order as illustrated in FIGS. 9 and 10, the same steps S201 and S202 as those according to the second embodiment of the present invention are provided, and if the temperature difference between the startup operation and the spin down is smaller than the predetermined value T_th, the calculation of the temperature characteristic compensation operation coefficient α_sa_hist is not performed. However, the processing in the steps S201 and S202 may be omitted, and the calculation of the temperature characteristic compensation operation coefficient α_sa_hist may be performed regardless of the temperature difference.

However, according to the processing order in consideration of the temperature difference as illustrated in FIGS. 9 and 10, an ineffective temperature characteristic compensation operation coefficient α_sa_hist is prevented from being added to the history, and thus is prevented from being included in the calculation of the temperature characteristic compensation operation coefficient α_sa_rev, which is used in calculating the startup initial SA, resulting in that the compensation state at the start of the startup becomes more appropriate.

Also, according to the processing order of FIGS. 9 and 10, after the history number becomes larger than m, the calculation of a new temperature characteristic compensation operation coefficient α_sa_rev using the latest m temperature characteristic compensation operation coefficients α_sa_hist is performed whenever the effective temperature characteristic compensation operation coefficient α_sa_hist is calculated. However, it is not necessary to perform the calculation of the new temperature characteristic compensation operation coefficient α_sa_rev every time, but may be performed whenever the calculation of the temperature characteristic compensation operation coefficient α_sa_hist is performed m times.

4. Fourth Embodiment

[4-1. Temperature Compensation Method According to a Fourth Embodiment]

In the fourth embodiment, in the case of performing a so called real-time adjustment operation, a real-time adjustment operation coefficient that is used for the real-time adjustment is calculated (i.e. updated) on the basis of the temperature characteristic compensation operation coefficient obtained by the method described up to now.

Here, the real-time adjustment operation, as described in Japanese Unexamined Patent Application Publication No. 2008-305477, is performed in a manner that adjustment values of such as focus bias, and SA are minutely increased/decreased during a reproducing operation, and evaluation values (e.g. jitter values) obtained accordingly are acquired as an index that indicates an error from the optimum value. Then, a control operation based on the evaluation value is performed to calculate the optimum adjustment values in real time.

As described above, the optimum value of the temperature is changed depending upon the position on the disc D. The real-time adjustment operation is performed for the purpose of following the change of the optimum values dependent upon the position on the disc D.

Figure 11:
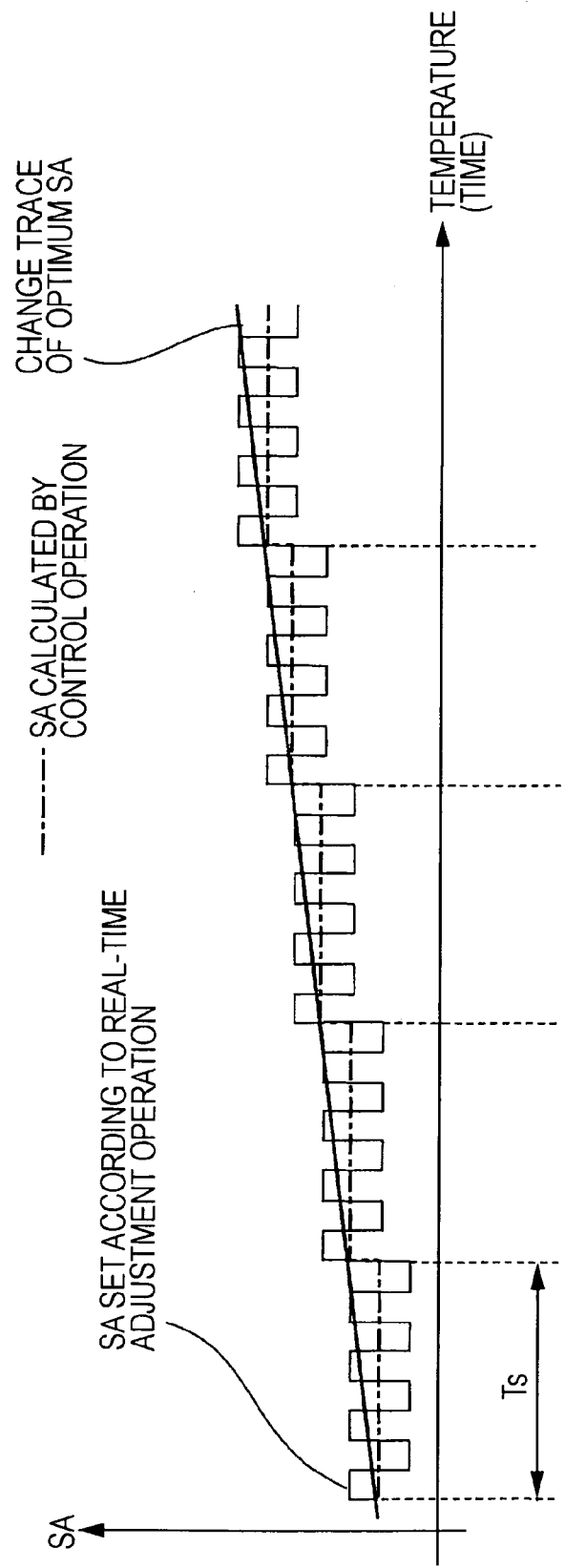
FIG. 11 is an image diagram of a real-time adjustment operation.

FIG. 11 is an image diagram of a real-time adjustment operation adopted in the embodiment of the present invention.

Even in this case, SA is exemplified as the characteristic that is changed by changes in temperature.

In FIG. 11, the horizontal axis represents temperature (time), and the vertical axis represents SA. FIG. 11 also illustrates relations among the change trace of the optimum SA (thick solid line in the drawing), SA set according to the real-time adjustment operation (solid line), and SA calculated by control operation (thick dashed dot line).

Here, due to the circumstances of illustration, the change trace of the optimum SA appears to be proportional to the temperature change. However, it is typical that the change trace of the corresponding optimum SA actually includes a change amount that is dependent upon the position on the disc D. As described above, the real-time adjustment operation is performed to follow even the change amount of the optimum value that is dependent upon the position on the disc D.

First, in the real-time adjustment operation, during a reproducing operation, the SA value is increased/decreased with the same amplitude value (i.e. absolute value) based on the value that is calculated as the optimum point at the time point. In the drawing, the "SA calculated by the control operation" corresponds to the "value calculated as the optimum point at the time point".

Accordingly, as indicated by the "SA set according to the real-time adjustment operation", the SA actually set during execution of the real-time adjustment operation is minutely changed with the same oscillation width on the basis of a certain value.

In the real-time adjustment operation, the evaluation values (in the embodiment of the present invention, jitter values) when the SA is minutely changed are acquired, and the optimum value of the SA is calculated through the control operation based on the evaluation values.

In the real-time adjustment operation, a period Ts (hereinafter referred to as a "search period Ts") for calculating the optimum value of SA from the evaluation values obtained by minutely changing the SA as described above has been determined. That is, in the real-time adjustment operation, new optimum SA values are sequentially calculated for each search period Ts.

Here, in the real-time adjustment operation according to the embodiment of the present invention, as the control operation equation that is used to calculate the optimum SA, a control operation equation by the same PI control (proportional/integral control) type as that disclosed in Japanese Unexamined Patent Application Publication No. 2008-305477 is adopted.

Specifically, $$v(r)=v(r-1)+Kp \times (z(r)-z(r-1))+Ki \times Ts \times (z(r)+z(r-1))-2 \times z\_t \quad (5)$$

where, in Equation (5), $v(r)$: optimum SA in the r-th search period, $v(r-1)$: optimum SA calculated in the (r-1)-th search period, Kp: proportional gain coefficient, Ki: integral gain coefficient, $z(r)$: difference between evaluation values in the r-th search period, $z(r-1)$: difference between evaluation values in the (r-1)-th search period, and $z\_t$: adjustment target (target value of the evaluation value difference.

Here, as shown in FIG. 11, the evaluation values (i.e. jitter values), which are obtained when the SA value is increased/decreased with the same oscillating width on the basis of the optimum SA at the time point, are values which are increased/decreased with the same oscillating width ideally on the basis of "0" (the jitter value ideally becomes the minimum value "0" if SA is optimum).

Using this point, in the embodiment of the present invention, after an average value of plus-side evaluation values obtained in the search period Ts (i.e. evaluation values obtained when SA on the increment side is set) and an average value of minus-side evaluation values (i.e. evaluation values obtained when SA on the decrement side is set) are calculated, a difference value between the average values is calculated as an evaluation index that indicates an error from the optimum SA. The evaluation index calculated as above corresponds to the "difference between evaluation values" $(Z(r)+z(r-1))$ in Equation (5).

The difference value z between the evaluation values becomes the minimum value "0" if SA calculated as the optimum value at the time point (indicated by a dashed dot line in FIG. 11) coincides with the true optimum SA (indicated by a thick solid line in FIG. 11). If an error exists from the true optimum SA, the difference value becomes a value which has a positive/negative polarity in accordance with the error direction and has an absolute value in accordance with the error amount.

Also, in Equation (5), the adjustment target $z\_t$ is a target value of the difference between the evaluation values. In the case of using the jitter values as the evaluation values as in the embodiment of the present invention, the corresponding adjustment target value $z\_t$ is set to the minimum value "0".

In summary, in the real-time adjustment operation based on the PI control, SA values are minutely increased/decreased with the same amplitude value (i.e. absolute value) on the basis of the optimum SA at the time pointing the current search period Ts (i.e. r-th search period Ts), and average values obtained accordingly are acquired to calculate the difference $z(r)$ between the evaluation values. Then, the optimum SA in the r-th search period Ts is calculated by Equation (5) using the corresponding difference value $z(r)$ between the evaluation values, the optimum SA value $v(r-1)$ (if $r=1$, the optimum SA obtained through the search during startup operation is used) that is calculated in the (r-1)-th search period TS already obtained, a difference value between evaluation values in the (r-1)-th search period Ts, the proportional gain coefficient Kp, the integral gain coefficient Ki, and the adjustment target value $z\_t$.

By repeating the above-described operation for the search period Ts, the real-time adjustment operation as illustrated in FIG. 11 is realized.

Here, in the real-time adjustment operation as described above, the proportional gain coefficient Kp and the integral gain coefficient Ki in Equation (5) become the coefficients for determining the following performance (i.e. control sensitivity) to the optimum adjustment value. Hereinafter, the gain coefficient that determines the control sensitivity in the real-time operation as described above is called a "real-time adjustment operation coefficient".

However, in an existing real-time adjustment operation as described in Japanese Unexamined Patent Application Publication No. 2008-305477, a fixed value that is determined in design is used as the real-time adjustment operation coefficient.

At this time, in determining the real-time adjustment operation coefficient as the fixed value, for example, the temperature-optimum value characteristic having an average slope such as the "average characteristic during shipment" is assumed as shown in FIG. 5, and then a following performance (i.e. control sensitivity) according to the average slope is obtained to determine the value as the real-time adjustment operation coefficient. However, in the case of using the real-time adjustment operation coefficient as the fixed value as determined above, for example, an object having a slope that becomes larger than the average slope has a relatively low control sensitivity, and thus it may be difficult to follow the change of the optimum value.

By contrast, in the object having a slope that becomes smaller than the average slope, the control sensitivity may become excessive, and in this case, the stability of the adjustment operation is lowered.

As can be understood with respect to these points, according to the existing real-time adjustment operation using the adjustment operation coefficient of the fixed value as described above, it is difficult to perform the optimum adjustment operation for each object, in the same manner as the temperature characteristic compensation operation coefficient having the fixed value.

In order to solve this problem, in the fourth embodiment of the present invention, the temperature characteristic compensation operation coefficient $\alpha\_sa\_rev$ according to the actual temperature-optimum value characteristic is calculated on the basis of two points acquired during startup operation and the spin down as described in the previous embodiments of the present invention, and then the optimum real-time adjustment operation coefficient value is calculated for each object on the basis of the corresponding temperature characteristic compensation operation coefficient $\alpha\_sa\_rev$.

Specifically, new real-time adjustment coefficients (which are the proportional gain coefficient Kp_rev and the integral gain coefficient Ki_rev) are calculated by the following Equations (6) and (7).

$$Kp\_rev = Kp \times \alpha\_sa\_rev/\alpha\_sa \quad (6)$$

$$Ki\_rev = Ki \times \alpha\_sa\_rev/\alpha\_sa \quad (7)$$

At this time, for confirmation, Kp (proportional gain coefficient) and Ki (integral gain coefficient) are real-time adjustment operation coefficients as the fixed values which are determined in the same method as the existing method. In the recording and reproducing apparatus according to the fourth embodiment, the real-time adjustment operation coefficients as the fixed value are predetermined as default values.

Here, as described above, the values of the real-time adjustment operation coefficients Kp and Ki as the fixed values are set on the basis of the average slope of the temperature-optimum value characteristic (i.e. in the embodiment of the present invention, the temperature characteristic compensation operation coefficient $\alpha\_sa$). In correspondence to this, in Equations (6) and (7), the (default) real-time adjustment operation coefficients Kp and Ki as the fixed values are multiplied by $\alpha\_sa\_rev/\alpha\_sa$ (the slope of the object/the average slope). Accordingly, as new real-time adjustment operation coefficients Kp_rev and Ki_rev, coefficients realizing the optimum control sensitivity (i.e. following performance) according to the actual slope (which includes a consecutively changed amount) of the object can be calculated.

After the new real-time adjustment operation coefficients Kp_rev and Ki_rev are calculated, the real-time adjustment operation using these real-time adjustment operation coefficients Kp_rev and Ki_rev is performed.

That is, in the real-time adjustment operation in this case, the calculation of the optimum SA for each search period Ts is performed by the following Equation (8).

$$v(r) = v(r-1) + Kp\_rev \times (z(r)-z(r-1)) + Ki\_rev \times Ts \times (z(r) + z(r-1)) - 2 \times z\_t \quad (5)$$

According to the fourth embodiment as described above, the real-time adjustment operation can be realized by the optimum control sensitivity according to the actual slope (which includes the consecutively changed amount) for each object. As a result, a high-accuracy real-time adjustment operation can be realized in comparison to that in the related art.

[4-2. Processing Order]

Figure 12:
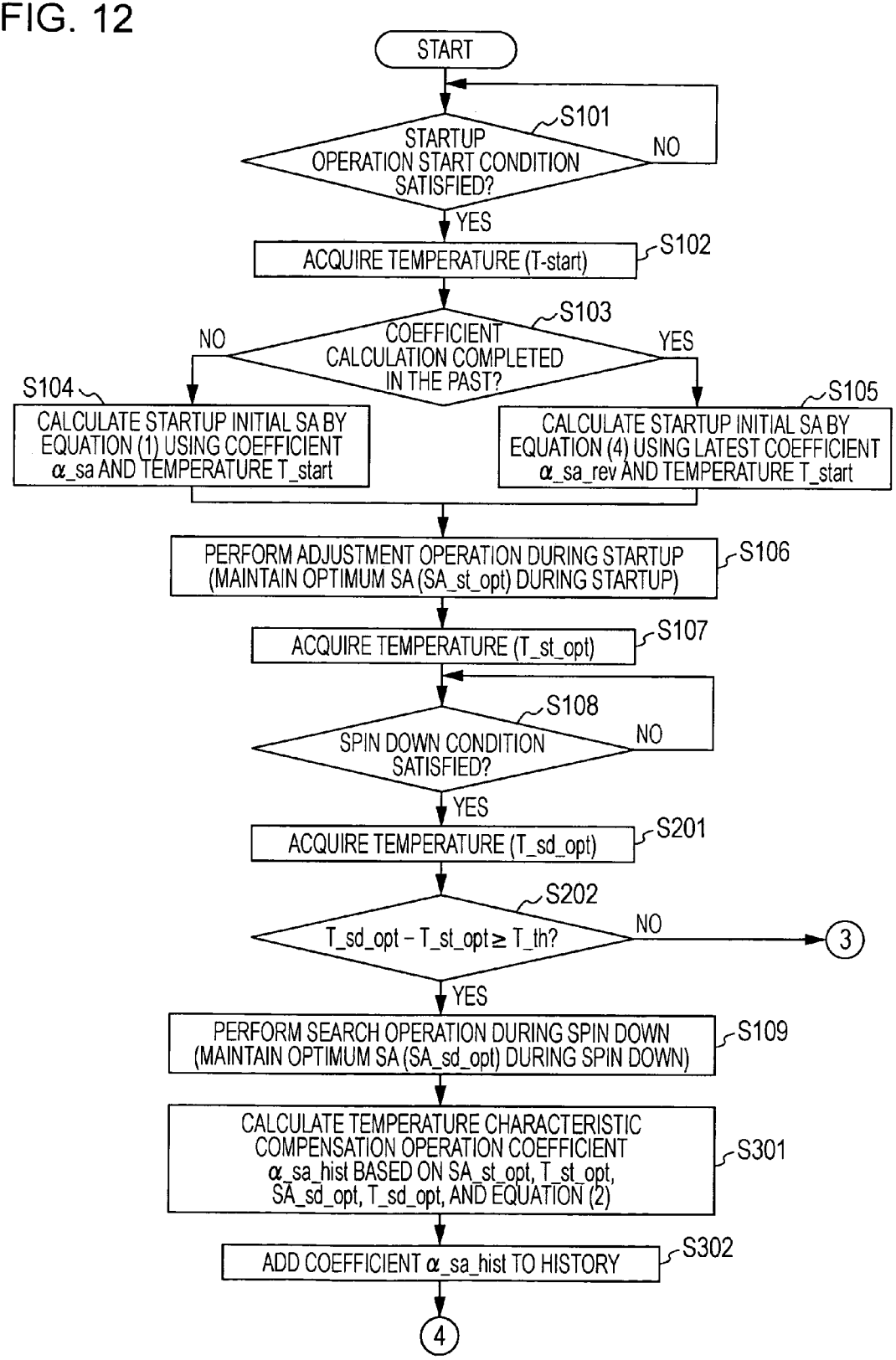
FIG. 12 is a flowchart illustrating an order of processes for realizing a temperature compensation method (i.e. processes for calculating new real-time adjustment operation coefficient) according to a fourth embodiment of the present invention.
Figure 13:
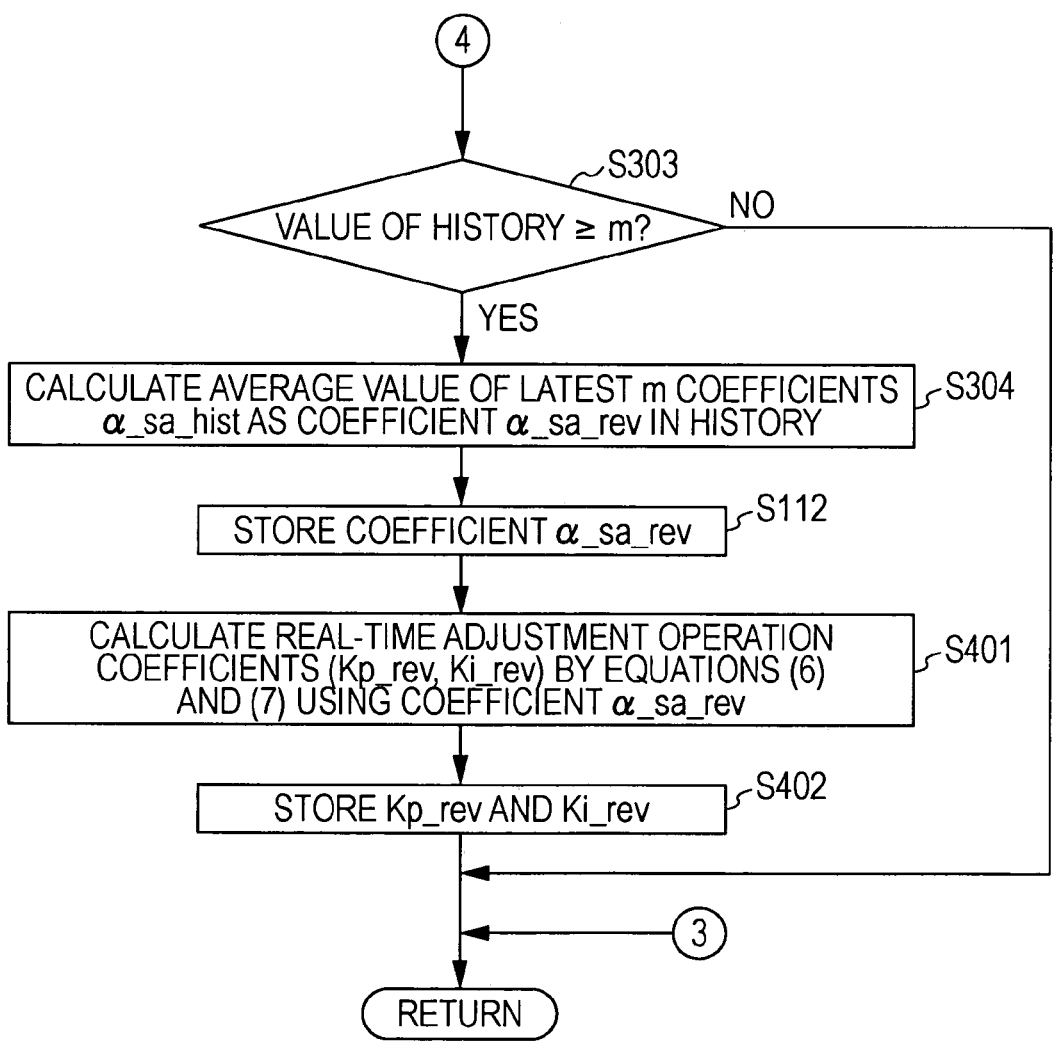
FIG. 13 is a flowchart illustrating an order of processes for realizing a temperature compensation method (i.e. processes for calculating new real-time adjustment operation coefficient) according to a fourth embodiment of the present invention in the same manner.
Figure 14:
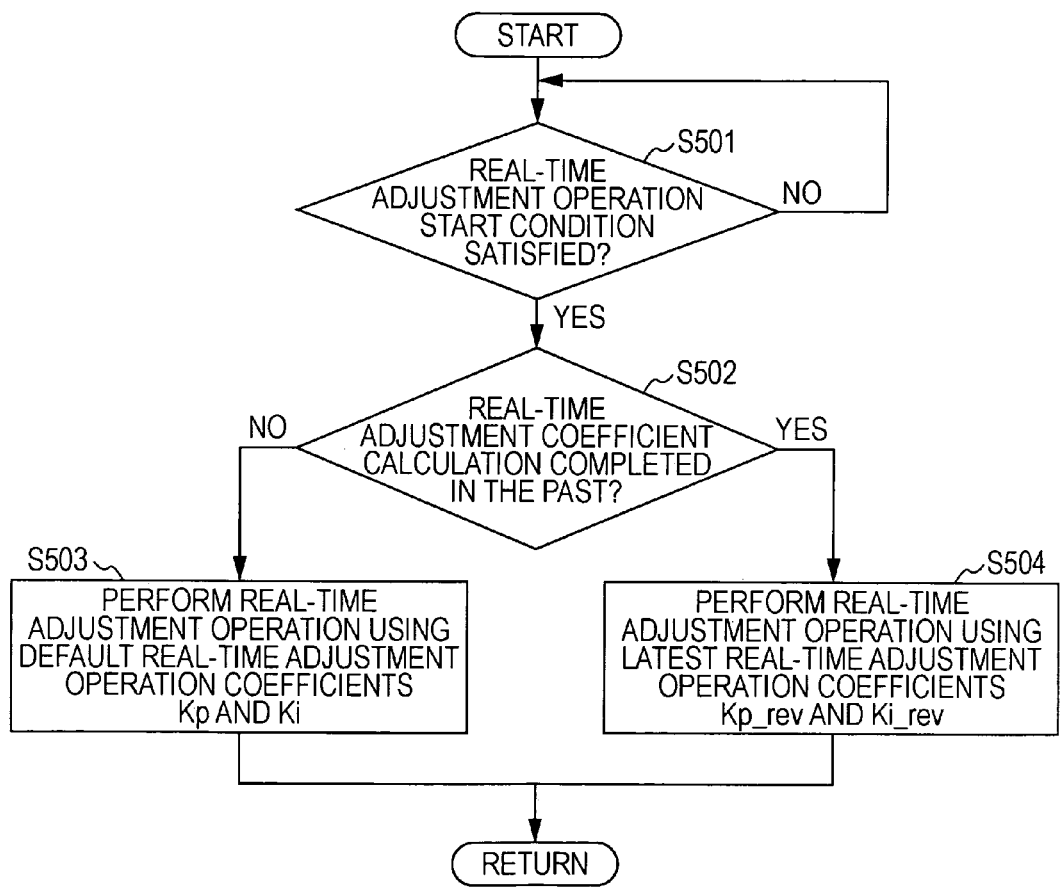
FIG. 14 is a flowchart illustrating an order of processes for realizing a temperature compensation method (i.e. processes which should be performed corresponding to the execution of a real-time adjustment operation) according to a fourth embodiment of the present invention.

FIGS. 12 to 14 are flowcharts illustrating an order of processes for realizing the temperature compensation method according to the fourth embodiment of the present invention as described above.

In the drawing, the order of processes that the system controller 10 as illustrated in FIG. 1 performs based on a program stored in, for example, an internal memory is illustrated.

Also, in the drawing, with respect to the same processes as those as described above according to the first embodiment, the same step numbers are given, and the explanation thereof will be omitted.

The flowchart of FIGS. 12 and 13 illustrates the order of processes for calculating new real-time adjustment operation coefficients Kp_rev and Ki_rev.

Also, FIG. 14 illustrates the order of processes to be performed to correspond to the execution of the real-time adjustment operation.

First, the flowchart of FIGS. 12 and 13 will be described.

As can be known by comparing the flowchart of FIGS. 12 and 13 with the flowchart of FIGS. 9 and 10 as described above, the processing order illustrated in FIGS. 12 and 13 is determined in a manner that the processes of steps S401 and S404 are added after the step S112 in the processing order according to the third embodiment of the present invention as shown in FIGS. 9 and 10.

Specifically, in this case, after the storing process of the temperature characteristic compensation operation coefficient $\alpha\_sa\_rev$ is executed by step S112 in FIG. 13, the real-time adjustment operation coefficients Kp_rev and Ki_rev are calculated by Equations (6) and (7) using the coefficient $\alpha\_sa\_rev$ in step S401.

That is, using the temperature characteristic compensation operation coefficient $\alpha\_sa\_rev$ and default real-time adjustment operation coefficients Kp and Ki pre-stored in, for example, an internal memory of the system controller 10, new real-time adjustment operation coefficients Kp_rev and Ki_rev are calculated by Equations (6) and (7).

Then, in step S402, the real-time adjustment operation coefficients Kp_rev and Ki_rev as calculated above are stored.

After the processing in the step S402, the processing returns to the step S101.

Then, the processing order that corresponds to the execution of the real-time adjustment operation as illustrated in FIG. 14 will be described.

First, in step S501, the processing is in a standby state until the start condition of the real-time adjustment operation is satisfied.

As can be understood from the foregoing description, the real-time adjustment is performed during reproducing operation. The real-time adjustment operation start condition may be, for example, the start of the reproducing operation, i.e. the supply of a read command from the AV system 15 or the like.

The processing in step S501 is, for example, to start the real-time adjustment such as the supply of the read command, and the processing is in a standby state until the predetermined condition is satisfied.

Then, as the real-time adjustment operation start condition is satisfied, it is determined whether the calculation of the real-time adjustment operation coefficient has been completed in the past in step S502. That is, it is determined whether the step S401 in FIG. 13 has been performed and the calculation of the new real-time adjustment operation coefficients Kp_rev and Ki_rev has been completed.

In step S502, if it is determined that the calculation of the real-time adjustment operation coefficients has not been completed and a negative result is obtained, the processing proceeds to step S503, and the real-time adjustment operation is performed using the default real-time adjustment operation coefficients Kp and Ki. That is, the real-time adjustment operation for calculating the optimum SA for each search period Ts according to Equation (5) is performed.

On the other hand, in the step S502, if it is determined that the calculation of the real-time adjustment operation coefficients has been completed and a positive result is obtained, the processing proceeds to step S504, and the real-time adjustment operation is performed using the latest real-time adjustment operation coefficients Kp_rev and Ki_rev. That is, the real-time adjustment operation for calculating the optimum SA for each search period Ts according to Equation (8) is performed using the latest real-time adjustment operation coefficients Kp_rev and Ki_rev.

Although the explanation by the illustration is omitted, the system controller 10 in this case actually waits for the satisfaction of the stop condition of the real-time adjustment operation in parallel with the processing in step S503 or S504 as illustrated in FIG. 14, and as the stop condition is satisfied, it performs the processing for stopping the real-time adjustment operation. The stop condition of the real-time adjustment operation may be an end of a reproducing operation or the like.

Here, even in the processing order as illustrate in FIGS. 12 and 13, the same steps S201 and S202 as those according to the second embodiment of the present invention are provided, and if the temperature difference between the startup operation and the spin down is smaller than the predetermined value T_th, the calculation of the temperature characteristic compensation operation coefficient α_sa_hist is not performed. However, even in this case, the processing in the steps S201 and S202 may be omitted, and the calculation of the temperature characteristic compensation operation coefficient α_sa_hist may be performed for each time regardless of the temperature difference.

Also, in the processing order as illustrated in FIGS. 12 and 13, in the same manner as in the third embodiment, an average value of m temperature characteristic compensation operation coefficients α_sa_hist is used as a new temperature characteristic compensation operation coefficient α_sa_rev. However, in the same manner as in the first embodiment, a method in which the calculation of such an average value is omitted may be adopted.

Also, in the fourth embodiment, it is exemplified that the real-time adjustment operation is performed based on PI control. However, the optimum value may also be calculated by a control operation according to another type such as PID control. Even in this case, the real-time adjustment operation coefficient that is used for the control operation is calculated from the temperature characteristic compensation operation coefficient by the same method as the method as described above, and thus the improvement of the accuracy of the real-time adjustment operation can be sought.

5. Modified Embodiment

Although the respective embodiments of the present invention have been exemplified, the present invention is not limited to the detailed embodiments as described above.

For example, although it is exemplified that only the temperature compensation method is performed for the spherical aberration correction values as an example of the characteristic change temperature-dependent adjustment value, the present invention can also be appropriately applied to a case where the temperature compensation is performed for other characteristic change temperature-dependent adjustment values such as values of focus bias, and tilt. That is, the same effect can be obtained by performing the temperature compensation in the same method as the method for the spherical aberration correction value as described above with respect to the characteristic change temperature-dependent adjustment values.

Although its illustration is omitted in FIG. 1, a configuration for tilt correction may be composed of an actuator for adjusting the slope (in radial/tangential direction) of the optical disc (e.g. for adjusting the slope of the spindle motor 2), or a liquid crystal device inserted into an optical path for correcting coma aberration.

In relation to this, a plastic lens is recently used as an object lens 26 for the purpose of cost reduction or the like. However, in this case, differences by objects between the temperature-optimum value characteristics especially for the spherical aberration correction values among the characteristic change temperature-dependent adjustment values become remarkable. Accordingly, in the case of using a plastic lens as the object lens 26, it is effective to perform temperature compensation especially with respect to the spherical aberration correction values.

Also, as described above, in calculating a new temperature characteristic compensation operation coefficient, it is exemplified to use the temperature and optimum value information that is obtained through the adjustment operation during startup operation and the temperature and optimum value information that is obtained through the search operation during spin down. For example, as exemplified in the embodiments of the present invention, in the case of performing the optimum laser power adjustment operation as a so called OPC (Optimum Power Control) before the apparatus that can perform recording on the disc D starts the recording operation, an adjustment operation for the optimum adjustment values can be performed during corresponding OPC. That is, using the optimum value during OPC that is obtained through the adjustment operation for the optimum adjustment value during corresponding OPC and temperature information (i.e. temperature information during OPC) at that time, instead of the temperature and optimum value information during startup operation, a new temperature characteristic compensation operation coefficient is calculated from two points of a set of the temperature and optimum value during OPC and a set of the temperature and optimum value during spin down.

Figure 15:
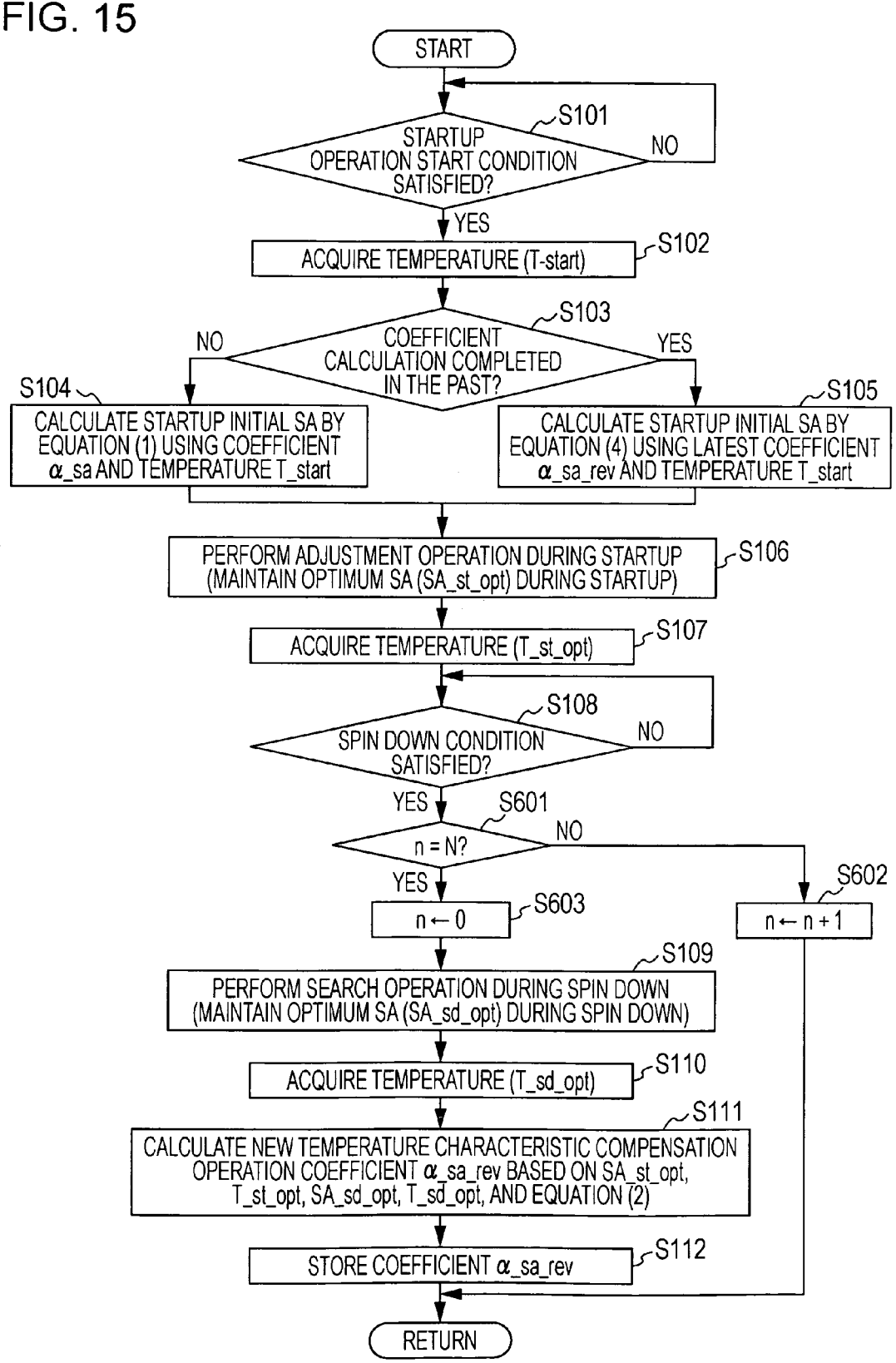
FIG. 15 is a flowchart illustrating an order of processes for realizing a temperature compensation method as a modified example that performs calculation of the temperature characteristic compensation operation coefficient for N times spin down.
Figure 18:
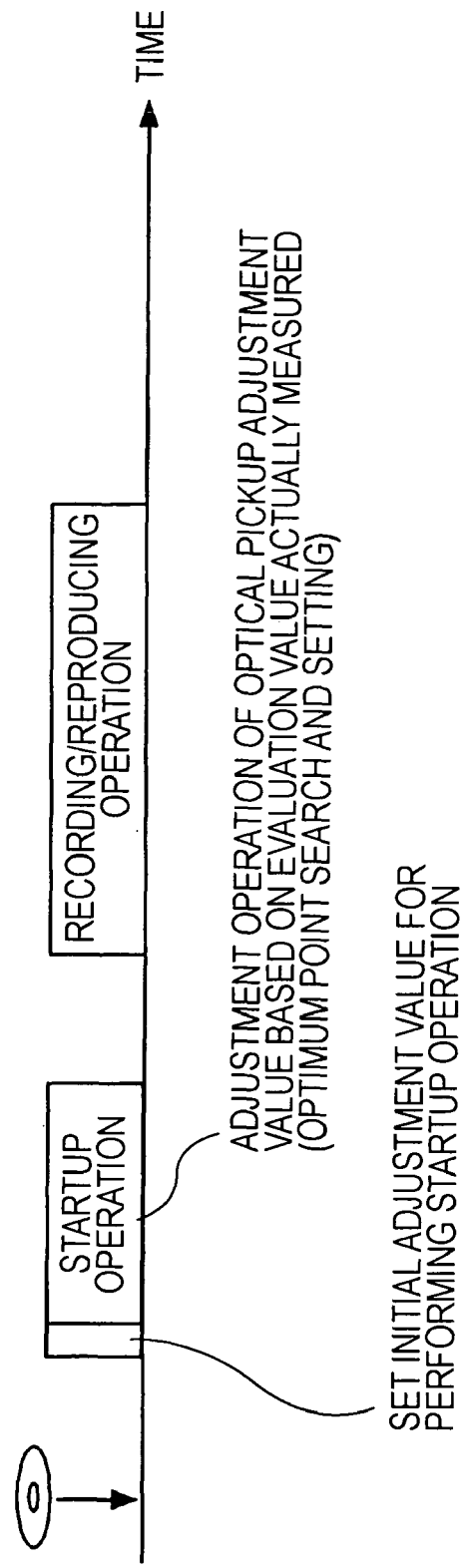
FIG. 18 is a diagram illustrating a startup operation.

Also, in the first embodiment of the present invention, it is exemplified that the calculation of a new temperature characteristic compensation operation coefficient is performed for each spin down. However, as illustrated in FIG. 15, the calculation of a new temperature characteristic compensation operation coefficient may be performed for N-times spin down operations.

Specifically, in this case, as the spin down condition is satisfied by the processing in step S108, it is determined whether the number of spin-downs n becomes a predetermined value N (i.e. n=N) in step S601.

In step S601, if it is determined that the condition n=N is not satisfied and a negative result is obtained, the processing proceeds to step S602 to increase the number of spin-downs n by 1 (i.e. n←n+1), and returns to step S101.

On the other hand, in the step S601, if it is determined that the condition n=N is satisfied and a positive result is obtained, the processing in steps S109 to S112 is performed as shown in the drawing.

By performing the above-described operation, the number of search operations during spin down or the number of times the calculation of a new temperature characteristic compensation operation coefficient is performed can be efficiently reduced.

Here, as can be understood from the description up to now, by calculating the temperature characteristic compensation operation coefficient at first time, the temperature characteristic compensation operation coefficient according to the temperature-optimum value characteristics by objects of the optical pickup OP, and by calculating the temperature characteristic compensation operation coefficient after the first time, the following of the consecutively changed temperature-optimum value characteristics becomes possible.

At this time, it is expected that the consecutive change of the temperature-optimum value characteristic is typically longer than a period when the spin down is performed. Accordingly, by making the search operation during spin down and a new coefficient calculation be performed for N-times spin down, both the following the consecutive change of the temperature-optimum value characteristic and the reduction of processing load according to the reduction of the number of search operations during spin down and the number of calculations of the new coefficients can be sought.

Also, the temperature compensation according to the embodiment of the present invention may be individually performed for each media kind or recording layer of the loaded optical disc or for each object of the optical disc.

Here, the "media kinds" may be briefly classified into a CD (Compact Disc), DVD (Digital Versatile Disc), and BD (Blu-ray disc), and may be further classified into CD-ROM, CD-R, CD-RW, DVD-ROM, DVD-R, DVD-RW, BD-ROM, BD-R, BD-RE, and the like, through addition of a ROM type (a reproducing dedicated type), a write-once type, and a rewritable type to the briefly classified discs.

For example, a case in which the temperature compensation is individually performed with respect to recording layers and the media kinds as described above will be described. In this case, a process of determining the media kind of the loaded optical disc is first added. Also, a process of determining the recording layers, on which the optimum value adjustment operation during startup operation and the optimum value search operation during spin down have been performed, is also performed.

In this case, the new temperature characteristic compensation operation coefficients, which are calculated on the basis of the optimum value obtained by the optimum value adjustment operation during startup operation and the temperature information at that time, and the optimum value obtained by the optimum value search operation during spin down and the temperature information at that time, are individually stored for each media kind specified as the result of determination processing and for each recording layer on which the search operation is performed.

FIG. 16 is a diagram illustrating an example of information on temperature characteristic compensation operation coefficients individually stored for each media kind and recording layer.

Using information on the temperature characteristic compensation operation coefficients stored for each media kind and recording layer, the calculation and setting of the startup initial adjustment value using the optimum temperature compensation operation coefficient according to the media kind of the loaded optical disc and the recording layer on which the startup operation is performed are performed. Specifically, at the start of the startup operation, with reference to information as illustrated in FIG. 16, it is determined whether the temperature characteristic compensation operation coefficient, which corresponds to the "media kind and recording layer" that coincide with the media kind of the loaded optical disc and with the recording layer on which the startup operation is to be performed up to now, has already been calculated. If it is determined that the corresponding temperature characteristic compensation operation coefficient has been calculated, the calculation and setting of the startup initial adjustment value are performed using the temperature characteristic compensation operation coefficient, while if it is determined that the corresponding temperature characteristic compensation operation coefficient has not bee calculated, the calculation and setting of the startup initial adjustment value are performed using the default temperature characteristic compensation operation coefficient.

As described above, by performing individual temperature compensation according to the media kind and the recording layer, the optimum temperature compensation can be realized according to the media kind and the recording layer.

Also, by individually calculating and storing the temperature characteristic compensation operation coefficient according to the media kind and the recording layer, a process for calculating a new temperature characteristic compensation operation coefficient (including the optimum search operation during spin down) can be omitted with respect to a combination of the media kind and the recording layer on which the temperature characteristic compensation operation coefficient has been calculated, and thus the reduction of the processing load can be sought.

According to this method, with respect to a combination of the media kind and the recording layer on which the temperature characteristic compensation operation coefficient has been calculated, the temperature compensation using the optimum temperature characteristic compensation operation coefficient according to the temperature-optimum value characteristic, which the object has from the start of the first time startup operation, can be performed.

Also, individual temperature compensation can be performed for each object of the optical disc.

In this case, the respective objects of the loaded optical disc are determined. Here, in the case where the optical disc is a writable disc, object identification number information (i.e. disc ID) is recorded on a specified region on the disc, and thus the determination of the object of the optical disc becomes possible during following loading of the disc. Also, in the case of a ROM type optical disc, the disc ID is pre-recorded on a specified region on the disc, and the apparatus determines this ID to perform the object determination.

At this time, the above-described object determination method is merely exemplary, and other methods such as, for example, recording the disc ID on a BCA (Burst Cutting Area) and identifying this, can be adopted.

In this case, a new temperature characteristic compensation operation coefficient, which is calculated on the basis of the optimum value obtained by the optimum adjustment operation during startup operation and the temperature information at that time and the optimum value obtained by the optimum value search operation during spin down and the temperature information at that time, is individually stored according to the disc ID acquired by the above-exemplified method. FIG. 17 illustrates an example of information stored accordingly.

In this case, at the start of the startup operation, with reference to information as illustrated in FIG. 17, it is determined whether the temperature characteristic compensation operation coefficient that corresponds to the disc ID of the loaded optical disc has already been calculated. If it is determined that the corresponding temperature characteristic compensation operation coefficient disc has been calculated, the calculation and setting of the startup initial adjustment value are performed using the temperature characteristic compensation operation coefficient. Also, if it is determined that the corresponding temperature characteristic compensation operation coefficient disc has not been calculated, the calculation and setting of the startup initial adjustment value are performed using the default temperature characteristic compensation operation coefficient.

Accordingly, the optimum temperature compensation can be realized for each object of the optical disc.

Also, according to the method, with respect to the optical disc on which the calculation of the coefficient has been completed, a duplicate process for the coefficient calculation can be omitted.

Here, as described above, on the straight line of Equation (2) that is calculated from the two points acquired during startup and during spin down, the slope component of the first term mainly expresses the temperature dependence of the optimum value that is inherent to the optical pickup OP, while the slope component of the second term mainly expresses the aberration amount (including the aberration amount for each recording layer) that is inherent to the optical disc.

Considering this point, on the assumption that an individual temperature compensation is performed according to the object of the optical disc for each media kind and recording layer as described above, the offset component of the "average characteristic during shipment" as in the embodiments is not used, but the offset component that is calculated by Equation (2) is used as it is as the offset component of the temperature-optimum value characteristic that is used for the temperature compensation, so that a more appropriate temperature compensation can performed with respect to either of the offset components.

In this point, in the case where an individual temperature compensation is performed according to the object of the optical disc for each media kind and recording layer as described above, it is efficient for the realization of more appropriate temperature compensation to use Equation (2) as it is rather than to use Equation (4) as described above as the calculation equation that is used in calculating the startup initial adjustment value.

Although only the temperature compensation at the start of the startup has been described, an individual adjustment operation according to the object of the optical disc can be performed for each media kind and recording layer even with respect to the real-time adjustment operation. In this case, using the information illustrated in FIGS. 16 and 17, an individual real-time adjustment operation coefficient according to the object of the optical disc is calculated for each media kind and recording layer, and the real-time adjustment operation is performed for each media kind and object of the loaded optical disc.

In the foregoing description, it is exemplified that jitter values are adopted as the evaluation values used during optimum value search operation. However, other evaluation values, such as bit error rate values, amplitude values of a wobble signal, amplitude values of an RF signal, evaluation values for a difference matrix (in the case of adopting PRML in binary processing, a value indicating an error or difference from an abnormal value) can be adopted.

In the embodiment of the present invention, the evaluation values, which are obtained on the basis of the reflected light from the optical disc, may be an evaluation index of the quality of a reproducing signal.

In the foregoing description, it is exemplified that the recording and reproducing apparatus can perform both the recording and reproducing of the optical disc. However, the present invention can be preferably applied even to a reproducing apparatus (i.e. dedicated reproducing apparatus) that can perform only the reproducing of the optical disc.

It should be understood by those skilled in the art that various modifications, combinations, sub-combinations and alterations may occur depending on design requirements and other factors insofar as they are within the scope of the appended claims or the equivalents thereof.

What is claimed is:

1. A recording and reproducing apparatus comprising:
a rotary drive unit which drives an optical disc recording medium to rotate;
an optical pickup unit which is configured to perform laser light radiation and reflected light detection with respect to the optical disc recording medium for data recording/reading;
an adjustment unit which compensates for changes in characteristics of the laser light caused by changes in temperature;
a temperature detection unit provided to perform temperature detection of the optical pickup unit;
an evaluation value generation unit which generates an evaluation value that becomes an index of reproducing signal quality based on reflected light information obtained from the optical pickup unit; and
a control unit which performs
a temperature acquisition process during a startup operation for acquiring a detected temperature detected by the temperature detection unit as temperature information during a startup operation, corresponding to the startup operation that is performed as a preparation operation for enabling data reproducing after the optical disc recording medium is loaded;
an optimum point adjustment process during a startup operation for sequentially changing adjustment values set in the adjustment unit to different values, searching for an optimum point of the adjustment values based on the result of acquiring an evaluation value that is generated by the evaluation value generation unit under the condition that the respective adjustment values are set, and controlling the adjustment unit to set the adjustment value as the optimum point;
a temperature acquisition process during spin down for acquiring a detected temperature detected by the temperature detection unit as temperature information during spin down as a specified condition, which is predetermined so as to stop the rotation of the optical disc recording medium that is rotated by the rotary drive unit, is satisfied after the startup operation is completed;
an optimum point search process during spin down for sequentially changing the adjustment values to the different values as the specified condition is satisfied, and searching for the optimum point of the adjustment values based on the result of acquiring the evaluation value that is generated by the evaluation value generation unit under the condition that the respective adjustment values are set; and a temperature characteristic compensation operation coefficient calculation process for calculating a temperature characteristic compensation operation coefficient for performing temperature compensation with respect to the adjustment values based on information on the optimum point during startup operation, which is obtained by the temperature information during startup operation and the optimum point adjustment process during startup operation, and information on the optimum point during spin down, which is obtained by the temperature information during spin down and the optimum point search process during spin down.

2. The recording and reproducing apparatus according to claim 1, wherein the control unit performs:

at a start of the startup operation after the spin down, a temperature acquisition process at the start of the startup operation for acquiring the detected temperature detected by the temperature detection unit as the temperature information at the start of the startup operation;

an initial adjustment value calculation process for calculating a startup initial adjustment value based on the temperature information at the start of the startup operation and the temperature characteristic compensation operation coefficient that is calculated by the temperature characteristic compensation operation coefficient calculation process; and an initial adjustment value setting control process for controlling the startup initial adjustment value to be set in the adjustment unit as the initial adjustment value at the start of the startup operation.

3. The recording and reproducing apparatus according to claim 1, wherein the control unit performs:

during execution of a reproducing operation, a real-time adjustment process for controlling the adjustment value that is increased/decreased on the basis of the optimum point obtained by the calculation to be set in the adjustment unit, acquiring the evaluation value generated by the evaluation value generation unit in a state in which the adjustment value is increased/decreased, and making the adjustment value follow the optimum point by repeating calculation of the optimum point of the acquired evaluation value and the adjustment value based on a specified control operation equation; and a real-time adjustment operation coefficient update process for newly calculating a gain coefficient in the control operation equation based on the temperature characteristic compensation operation coefficient that is calculated by the temperature characteristic compensation operation coefficient calculation process.

4. The recording and reproducing apparatus according to claim 1, wherein the control unit performs control so that the optimum point search operation that is performed by the optimum point adjustment process during startup operation and the optimum point search operation that is performed by the optimum point search process during spin down are performed using the same area on the optical disc recording medium.

5. The recording and reproducing apparatus according to claim 1, wherein the control unit performs:

a first determination process for determining whether a difference value between the temperature that is acquired by the temperature acquisition process during startup operation and the temperature that is acquired by the temperature acquisition process during spin down is equal to or larger than a specified value; and the optimum point search process during spin down if it is determined that the difference value of the temperature is equal to or larger than the specified value by the first determination process.

6. The recording and reproducing apparatus according to claim 2, wherein the control unit performs:

a coefficient average value calculation process for calculating an average value of the past temperature characteristic compensation operation coefficients calculated by the temperature characteristic compensation operation coefficient calculation process; and in the initial adjustment value calculation process, calculation of the startup initial adjustment value based on the temperature information at the start of the startup operation and the temperature characteristic compensation operation coefficient as the average value that is calculated by the coefficient average value calculation process.

7. The recording and reproducing apparatus according to claim 1, wherein the adjustment unit performs an adjustment on any one of adjustment items of spherical aberration, focus bias, and tilt.

8. The recording and reproducing apparatus according to claim 1, wherein an OPC (Optimum Power Control) is performed in the case where recording on the optical disc recording medium is to be performed; and wherein the control unit performs:

a temperature acquisition process during OPC for acquiring the detected temperature detected by the temperature detection unit as temperature information during OPC when the OPC is performed; and an optimum point adjustment process during OPC for sequentially changing the adjustment values set in the adjustment unit to different values when the OPC is performed, searching for the optimum point of the adjustment values based on the result of acquiring the evaluation value that is generated by the evaluation value generation unit under the condition that the respective adjustment values are set, and controlling the adjustment unit to set the adjustment value as the optimum point.

9. The recording and reproducing apparatus according to claim 1, wherein the control unit performs:

a second determination process for determining whether the number of spin-downs reaches a predetermined number of times; and the optimum point search process during spin down if it is determined by the second determination process that the number of spin-downs reaches the predetermined number of times.

10. The recording and reproducing apparatus according to claim 1, wherein the control unit performs:

a media kind determination process for determining the media kind of the loaded optical disc recording medium; and storing of the temperature characteristic compensation operation coefficient that is calculated by the temperature characteristic compensation operation coefficient calculation process for each media kind determined by the media kind determination process.

11. The recording and reproducing apparatus according to claim 10, wherein the control unit determines a CD (Compact Disc), a DVD (Digital Versatile Disc), and a BD (High-Density Optical Disc) from one another in the media kind determination process.

12. The recording and reproducing apparatus according to claim 10, wherein the control unit further determines a CD, a DVD, and a BD from one another and determines a write-once type and a rewritable type from each other in the media kind determination process.

13. The recording and reproducing apparatus according to claim 1, wherein in the case in which the loaded optical disc recording medium is a multilayer disc having a plurality of recording layers, the control unit stores the temperature characteristic compensation operation coefficient that is calculated by the temperature characteristic compensation operation coefficient calculation process for each of the recording layers.

14. The recording and reproducing apparatus according to claim 1, wherein the control unit performs:
 a disc object determination process for determining each object of the loaded optical disc recording medium; and
 storing of the temperature characteristic compensation operation coefficient that is calculated by the temperature characteristic compensation operation coefficient calculation process for each object that is determined by the disc object determination process.

15. A method of calculating a temperature characteristic compensation operation coefficient for an adjustment value of an adjustment unit in a recording and reproducing apparatus which includes a rotary drive unit which drives an optical disc recording medium to rotate, an optical pickup unit which is configured to perform laser light radiation and reflected light detection with respect to the optical disc recording medium for data recording/reading, the adjustment unit which compensates for changes in characteristics of laser light caused by changes in temperature; a temperature detection unit provided to perform temperature detection of the optical pickup unit, and an evaluation value generation unit which generates an evaluation value that becomes an index of reproducing signal quality based on reflected light information obtained from the optical pickup unit, the method comprising the steps of:
 acquiring a temperature detected by the temperature detection unit as temperature information during a startup operation, corresponding to the startup operation that is performed as a preparation operation for enabling data reproducing after the optical disc recording medium is loaded;
 sequentially changing adjustment values set in the adjustment unit to different values during startup operation, searching for an optimum point of the adjustment values based on the result of acquiring an evaluation value that is generated by the evaluation value generation unit under the condition that the respective adjustment values are set, and controlling the adjustment unit to set the adjustment value as the optimum point;
 acquiring a temperature detected by the temperature detection unit as temperature information during spin down as a specified condition, which is predetermined so as to stop the rotation of the optical disc recording medium that is rotated by the rotary drive unit, which is satisfied after the startup operation is completed;
 sequentially changing the adjustment values to the different values as the specified condition is satisfied during spin down, and searching for the optimum point of the adjustment values based on the result of acquiring the evaluation value that is generated by the evaluation value generation unit under the condition that the respective adjustment values are set; and
 calculating a temperature characteristic compensation operation coefficient for performing temperature compensation with respect to the adjustment values based on information on the optimum point during startup operation, which is obtained by the temperature information during startup operation and the optimum point adjustment process during startup operation, and information on the optimum point during spin down, which is obtained by the temperature information during spin down and the optimum point search process during spin down.

16. A reproducing apparatus comprising:
 a rotary drive unit which drives an optical disc recording medium to rotate;
 an optical pickup unit which is configured to perform laser light radiation and reflected light detection with respect to the optical disc recording medium for data reading;
 an adjustment unit which compensates for changes in characteristics of the laser light caused by changes in temperature;
 a temperature detection unit provided to perform temperature detection of the optical pickup unit;
 an evaluation value generation unit which generates an evaluation value that becomes an index of reproducing signal quality based on reflected light information obtained from the optical pickup unit; and
 a control unit which performs
 a temperature acquisition process during a startup operation for acquiring a detected temperature detected by the temperature detection unit as temperature information during a startup operation, corresponding to the startup operation that is performed as a preparation operation for enabling data reproducing after the optical disc recording medium is loaded;
 an optimum point adjustment process during a startup operation for sequentially changing adjustment values set in the adjustment unit to different values, searching for an optimum point of the adjustment values based on the result of acquiring an evaluation value that is generated by the evaluation value generation unit under the condition that the respective adjustment values are set, and controlling the adjustment unit to set the adjustment value as the optimum point;
 a temperature acquisition process during spin down for acquiring a detected temperature detected by the temperature detection unit as temperature information during spin down as a specified condition, which is predetermined so as to stop the rotation of the optical disc recording medium that is rotated by the rotary drive unit, which is satisfied after the startup operation is completed;
 an optimum point search process during spin down for sequentially changing the adjustment values to the different values as the specified condition is satisfied, and searching for the optimum point of the adjustment values based on the result of acquiring the evaluation value that is generated by the evaluation value generation unit under the condition that the respective adjustment values are set; and
 a temperature characteristic compensation operation coefficient calculation process for calculating a temperature characteristic compensation operation coefficient for performing temperature compensation with respect to the adjustment values based on information on the optimum point during startup operation, which is obtained by the temperature information during startup operation and the optimum point adjustment process during startup operation, and information on the optimum point during spin down, which is obtained by the temperature information during spin down and the optimum point search process during spin down.

17. A method of calculating a temperature characteristic compensation operation coefficient for an adjustment value of an adjustment unit in a reproducing apparatus which includes a rotary drive unit which drives an optical disc recording medium to rotate, an optical pickup unit which is configured to perform laser light radiation and reflected light detection with respect to the optical disc recording medium for data reading, the adjustment unit which compensates for changes in characteristics of the laser light caused by changes in temperature, a temperature detection unit provided to perform temperature detection of the optical pickup unit, and an evaluation value generation unit which generates an evaluation value that becomes an index of reproducing signal quality based on reflected light information obtained from the optical pickup unit, the method comprising the steps of:

acquiring a temperature detected by the temperature detection unit as temperature information during a startup operation, corresponding to the startup operation that is performed as a preparation operation for enabling data reproducing after the optical disc recording medium is loaded;

sequentially changing adjustment values set in the adjustment unit to different values during startup operation, searching for an optimum point of the adjustment values based on the result of acquiring an evaluation value that is generated by the evaluation value generation unit under the condition that the respective adjustment values are set, and controlling the adjustment unit to set the adjustment value as the optimum point;

acquiring a detected temperature detected by the temperature detection unit as temperature information during spin down as a specified condition, which is predetermined so as to stop the rotation of the optical disc recording medium that is rotated by the rotary drive unit, which is satisfied after the startup operation is completed;

sequentially changing the adjustment values to the different values as the specified condition is satisfied during spin down, and searching for the optimum point of the adjustment values based on the result of acquiring the evaluation value that is generated by the evaluation value generation unit under the condition that the respective adjustment values are set; and calculating a temperature characteristic compensation operation coefficient for performing temperature compensation with respect to the adjustment values based on information on the optimum point during startup operation, which is obtained by the temperature information during startup operation and the optimum point adjustment process during startup operation, and information on the optimum point during spin down, which is obtained by the temperature information during spin down and the optimum point search process during spin down.

* * * * *